United States Patent
Pozgay et al.

(10) Patent No.: US 7,926,585 B2
(45) Date of Patent: Apr. 19, 2011

(54) METHOD AND APPARATUS FOR AN ARTICULATING DRILL

(75) Inventors: David Pozgay, Evanston, IL (US); Harald Krondorfer, Mundelein, IL (US); John B. Freese, Evanston, IL (US)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 11/593,187

(22) Filed: Nov. 3, 2006

(65) Prior Publication Data
US 2007/0144752 A1 Jun. 28, 2007

Related U.S. Application Data

(60) Provisional application No. 60/733,546, filed on Nov. 4, 2005.

(51) Int. Cl.
*B23B 45/00* (2006.01)
*B25B 17/00* (2006.01)
(52) U.S. Cl. ............. 173/39; 173/170; 173/216; 81/57; 81/57.26; 81/57.28
(58) Field of Classification Search .............. 173/1, 39, 173/170, 216, 217; 81/57, 57.26, 57.28
See application file for complete search history.

(56) References Cited

U.S. PATENT DOCUMENTS

| | | |
|---|---|---|
| 66,052 A | 6/1867 | Smith |
| 661,418 A | 11/1900 | McClellan |
| 1,324,258 A | 12/1919 | Lewis |
| 1,806,582 A | 5/1931 | Beutner |
| 2,097,878 A * | 11/1937 | Grabe ..................... 148/663 |
| 2,106,937 A | 2/1938 | Torbert, Jr. |
| 2,155,082 A | 4/1939 | Decker |
| 2,198,397 A * | 4/1940 | Szekely ................... 475/108 |
| 2,348,266 A | 5/1944 | Selby |

(Continued)

FOREIGN PATENT DOCUMENTS

DE 100 01 091 7/1991

(Continued)

OTHER PUBLICATIONS

Fairchild Semiconductor: QRD1113/1114—Reflective Object Sensor Internet Article, [Online] 2000, XP002428935 Retrieved from the Internet: URL:http//www.datasheetcatalog.com/datasheets_pdf/Q/R/1/QRD1114.shtml >[retrieved on Apr. 23, 2007] cited in the application Datasheet downloaded from: http://www.ortodoxism.ro/datasheets/fairchild/QRD1114.pdf the whole document.

(Continued)

*Primary Examiner* — Rinaldi I Rada
*Assistant Examiner* — Gloria R Weeks
(74) *Attorney, Agent, or Firm* — Maginot, Moore & Beck

(57) ABSTRACT

The present invention is an articulating hand power tool with a head portion including a head housing, a bit holder rotatably positioned within the head housing, and a bearing member operable to transfer a first axial force from the bit holder to the head housing. A frame is rotatably connected to the head portion for placement in a plurality of positions with respect to the head portion and operably connected to the head housing for receiving the first axial force transferred to the head housing. The tool further includes an articulating gear system for transferring rotational force generated by a motor to the bit holder at each of the plurality of positions.

20 Claims, 19 Drawing Sheets

U.S. PATENT DOCUMENTS

| Number | | Date | Name | Ref |
|---|---|---|---|---|
| 2,414,637 | A | 1/1947 | Crump | |
| 2,546,655 | A | 3/1951 | Shaler | |
| 2,791,142 | A | 5/1957 | Lyon | |
| 3,006,202 | A * | 10/1961 | Moorhead | 173/48 |
| 3,109,238 | A | 11/1963 | Marks | |
| 3,203,275 | A * | 8/1965 | Hoover | 74/665 GA |
| 3,427,520 | A | 2/1969 | Oppedahl | |
| 3,475,676 | A | 10/1969 | Hutson | |
| 3,477,007 | A | 11/1969 | Duocommun et al. | |
| 3,904,943 | A | 9/1975 | Klang | |
| 4,267,914 | A | 5/1981 | Saar | |
| 4,296,654 | A | 10/1981 | Mercer | |
| 4,332,147 | A | 6/1982 | Grech | |
| 4,347,450 | A | 8/1982 | Colligan | |
| 4,463,293 | A | 7/1984 | Hornung et al. | |
| 4,522,270 | A * | 6/1985 | Kishi | 173/217 |
| 4,527,103 | A | 7/1985 | Kade | |
| 4,528,486 | A | 7/1985 | Flaig et al. | |
| 4,544,869 | A | 10/1985 | Pittaway | |
| 4,554,980 | A | 11/1985 | Doniwa | |
| 4,577,986 | A * | 3/1986 | Wang | 403/93 |
| 4,581,565 | A | 4/1986 | Van Pelt et al. | |
| 4,677,356 | A | 6/1987 | Tsuneda et al. | |
| 4,705,997 | A | 11/1987 | Juzwik | |
| 4,816,726 | A | 3/1989 | Nois et al. | |
| 4,901,366 | A | 2/1990 | Röttger | |
| 5,022,118 | A * | 6/1991 | Wan-Li | 16/327 |
| 5,122,146 | A | 6/1992 | Chapman et al. | |
| 5,149,230 | A * | 9/1992 | Nett | 408/42 |
| 5,161,437 | A * | 11/1992 | Yasutomi et al. | 81/57.14 |
| 5,165,172 | A | 11/1992 | Weinrauch | |
| 5,177,424 | A | 1/1993 | Connors | |
| 5,327,794 | A | 7/1994 | van den Elshout | |
| 5,331,258 | A | 7/1994 | Lankin et al. | |
| 5,332,954 | A | 7/1994 | Lankin | |
| 5,354,246 | A * | 10/1994 | Gotman | 475/248 |
| 5,365,155 | A | 11/1994 | Zimmermann | |
| 5,410,229 | A | 4/1995 | Sebastian et al. | |
| 5,428,522 | A | 6/1995 | Millner et al. | |
| 5,533,581 | A * | 7/1996 | Barth et al. | 173/216 |
| D377,303 | S | 1/1997 | Nagel | |
| 5,784,934 | A | 7/1998 | Izumisawa | |
| 5,889,376 | A | 3/1999 | Takatsuka et al. | |
| 5,892,885 | A | 4/1999 | Smith et al. | |
| 5,934,384 | A * | 8/1999 | Wang | 173/132 |
| D414,093 | S | 9/1999 | Zurwelle | |
| 5,993,069 | A * | 11/1999 | Arrasmith et al. | 384/477 |
| 6,039,126 | A * | 3/2000 | Hsieh | 173/216 |
| 6,102,632 | A | 8/2000 | Potter et al. | |
| 6,244,358 | B1 * | 6/2001 | Beer et al. | 173/178 |
| D444,363 | S | 7/2001 | Hayakawa et al. | |
| 6,296,427 | B1 | 10/2001 | Potter et al. | |
| 6,307,337 | B1 | 10/2001 | Nelson | |
| 6,321,856 | B1 * | 11/2001 | Alsruhe | 173/217 |
| 6,364,033 | B1 * | 4/2002 | Hung et al. | 173/217 |
| 6,386,075 | B1 * | 5/2002 | Shiao | 81/177.8 |
| D458,101 | S | 6/2002 | Hartman et al. | |
| 6,461,088 | B2 | 10/2002 | Potter et al. | |
| 6,477,940 | B1 * | 11/2002 | Danckert et al. | 92/172 |
| 6,479,958 | B1 | 11/2002 | Thompson et al. | |
| 6,487,940 | B2 * | 12/2002 | Hart et al. | 81/57.14 |
| 6,506,002 | B1 * | 1/2003 | Cummins | 408/35 |
| 6,528,968 | B2 | 3/2003 | Seima et al. | |
| D479,455 | S | 9/2003 | Waldron | |
| 6,617,913 | B1 | 9/2003 | Johnson | |
| 6,817,424 | B1 * | 11/2004 | Su et al. | 173/217 |
| 6,929,074 | B1 | 8/2005 | Lai | |
| 6,938,706 | B2 * | 9/2005 | Ng | 173/216 |
| 7,024,966 | B2 * | 4/2006 | Chao | 81/57.26 |
| 7,055,622 | B2 | 6/2006 | Bone | |
| 7,191,677 | B2 * | 3/2007 | Barkdoll | 74/396 |
| 7,207,233 | B2 * | 4/2007 | Wadge | 74/412 R |
| 7,281,591 | B2 * | 10/2007 | Bone | 173/217 |
| 7,487,844 | B2 * | 2/2009 | DeCicco et al. | 173/2 |
| 2002/0151262 | A1 | 10/2002 | Berger et al. | |
| 2003/0015066 | A1 | 1/2003 | Chao | |
| 2003/0034164 | A1 | 2/2003 | Rudolf et al. | |
| 2003/0042859 | A1 | 3/2003 | Gorti et al. | |
| 2003/0110645 | A1 * | 6/2003 | Phillips et al. | 30/392 |
| 2003/0190877 | A1 | 10/2003 | Gallagher et al. | |
| 2003/0202851 | A1 | 10/2003 | Kovarik | |
| 2004/0159172 | A1 | 8/2004 | Barkdoll | |
| 2005/0103510 | A1 | 5/2005 | Gass et al. | |
| 2005/0127862 | A1 | 6/2005 | Glasgow et al. | |
| 2005/0225183 | A1 | 10/2005 | Braun et al. | |
| 2005/0247466 | A1 * | 11/2005 | Andriolo et al. | 173/170 |
| 2006/0096770 | A1 * | 5/2006 | Roberts | 173/217 |
| 2006/0123941 | A1 | 6/2006 | Wadge | |
| 2006/0192527 | A1 | 8/2006 | Kageler et al. | |
| 2006/0213333 | A1 | 9/2006 | Kageler et al. | |
| 2006/0219059 | A1 | 10/2006 | Kageler et al. | |
| 2006/0220612 | A1 | 10/2006 | Feldmann et al. | |
| 2007/0144752 | A1 * | 6/2007 | Pozgay et al. | 173/216 |

FOREIGN PATENT DOCUMENTS

| | | |
|---|---|---|
| DE | 41 16 343 | 11/1992 |
| DE | 200 09 362 | 8/2001 |
| DE | 103 18 563 | 3/2004 |
| DE | 20 2004 007908 | 9/2004 |
| DE | 103 45 133 | 4/2005 |
| EP | 0 213 830 | 3/1987 |
| EP | 1 081 827 | 3/2001 |
| EP | 1 186 383 | 3/2002 |
| EP | 1 314 518 | 5/2003 |
| EP | 1 319 478 | 6/2003 |
| EP | 1 369 208 | 12/2003 |
| EP | 1 454 713 | 9/2004 |
| EP | 1 537 948 | 6/2005 |
| GB | 1 481 093 | 7/1977 |
| GB | 1 495 808 | 12/1977 |
| GB | 2 303 568 | 2/1997 |

OTHER PUBLICATIONS

STMicroelectronics, "TD340 H-Bridge Quad Power MOSFET Driver for DC Motor Control," Italy, 2001.

Black&Decker, "6v PivotPlus™ Rechargeable Drill and Screwdriver, Model PD600," downloaded from company website @ http://www.blackanddecker.com, Oct. 30, 2006.

Black&Decker, "Firestorm Screwdriver, Model #FS360," downloaded from company website @ http://www.blackanddecker.com, Oct. 30, 2006.

Skil, "3.6 Volt Twist® Power Driver—Model #2936," downloaded from company website @ http://www.skiltools.com, Oct. 31, 2006.

* cited by examiner

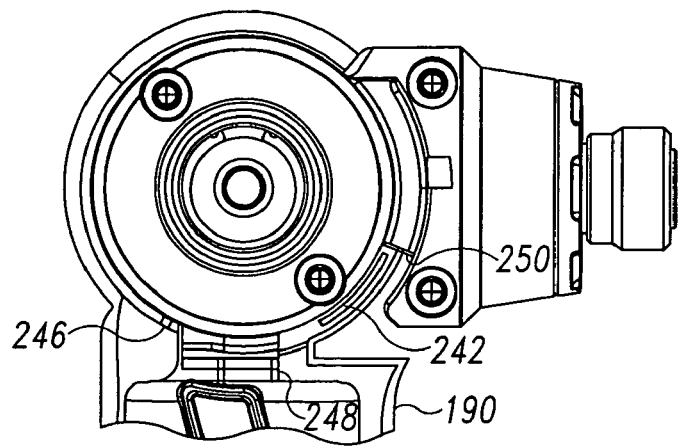
Fig. 18
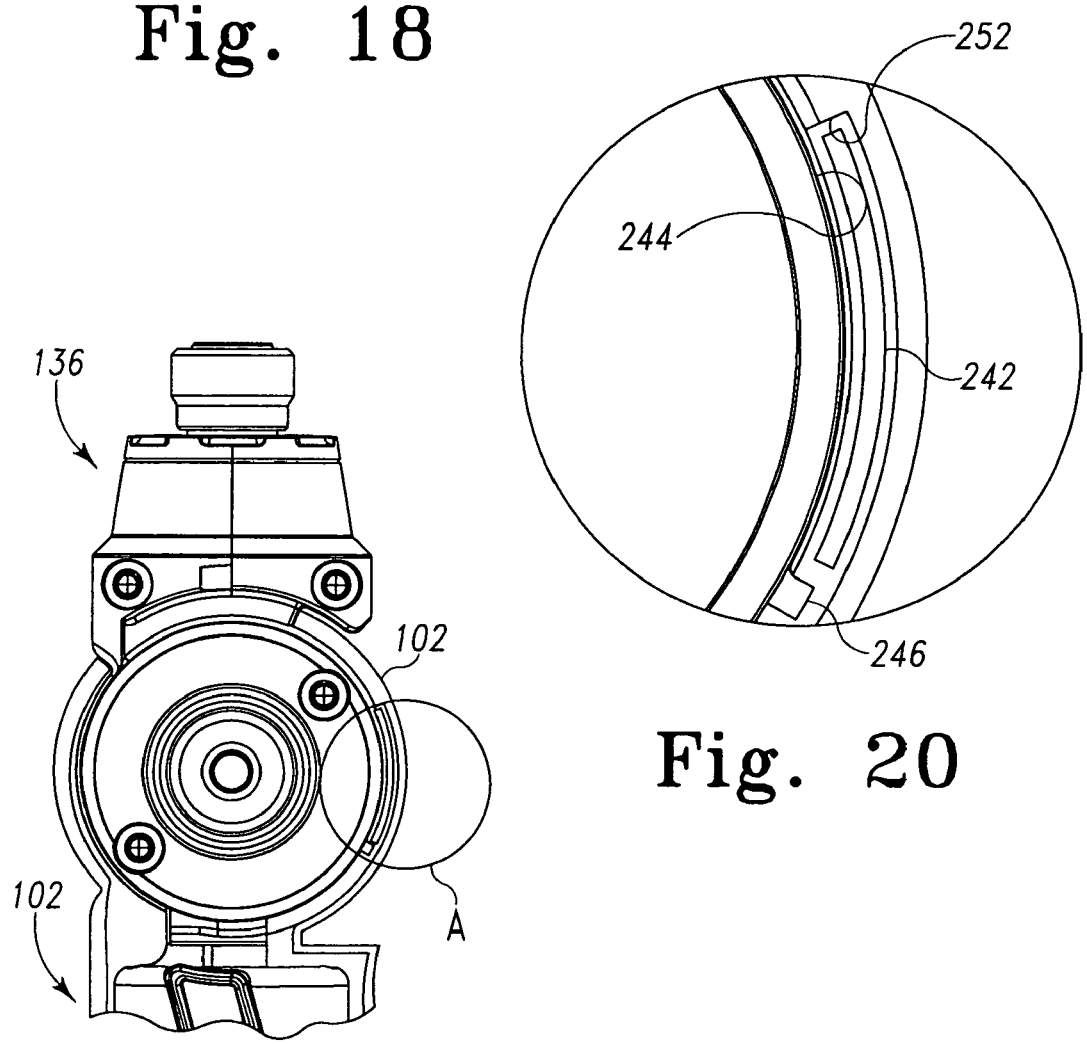
Fig. 20
Fig. 19

METHOD AND APPARATUS FOR AN ARTICULATING DRILL

This application claims the benefit of provisional U.S. Patent Application No. 60/733,546, filed on Nov. 4, 2005. The disclosure of this provisional patent application is hereby totally incorporated by reference in its entirety.

FIELD OF THE INVENTION

The present invention relates to an electric hand tool and more particularly to an articulating power hand tool.

BACKGROUND

Electric drills are usually constructed as straight-drilling machines in which the drill spindle extends parallel to the motor shaft and axis of the housing and, for specific purposes, as angular-drilling machines in which the drill spindle is aligned at a right angle to the motor shaft and housing axis. In certain applications in which both straight and angular drilling must be carried out, as is the case in installations in wooden house construction, the two machines must be at hand for continuous alternation.

The use of a tool receptacle head serving as special accessory for a conventional drill to eliminate the need for two drills is known. By way of example, DE 36 34 734 A1 discloses a drill that includes two separate housing parts which are located opposite one another to define a hollow space and which are guided along a diagonally extending dividing plane. One housing part carries a support for a drive shaft and the other housing part carries a support for a power take-off shaft which projects out of the tool receptacle head and carries a drill chuck. The drive shaft and power take-off shaft are connected with one another by a double cardan or universal joint so as to be rigid with respect to torsion relative to one another. One hollow-cylindrical housing part of the tool receptacle head is placed on the spindle neck of the drill and the drill spindle of the drill is coupled with a driver by means of a double edge. The driver sits on the drive shaft so as to be fixed with respect to rotation relative to it. In the basic position of the two housing parts, the axes of the drive and power take-off shafts are flush with one another. Due to the relative rotation of the two housing parts, the power take-off shaft can be aligned in such a way that its axis encloses an acute or right angle with the axis of the drive shaft.

A standard drill can be re-tooled with this known tool receptacle head so as to form an angle drill which can also perform straight drilling. While such a separate tool receptacle head serving as attachment may be suited to the requirements of some hobbyists, it is not acceptable for professional machines.

U.S. Pat. No. 5,533,581 discloses a drill suitable for professional use that includes a drill with a housing, an electric motor which is received in the housing, a motor shaft parallel to the housing axis, and a work spindle which is driven by the electric motor via a transmission gearing. The housing is divided along a dividing plane for the purpose of switching from straight drilling to angular drilling and it is provided that the front housing part containing a bearing for the work spindle and the rear housing part containing the electric motor can swivel relative to one another in such a way that the work spindle projecting out of the front housing part can occupy any angle between 0 degrees and 90 degrees or more relative to the motor shaft. A catch lock which can be unlocked and/or locked manually stops the two housing parts in the selected swivel position. A torsionally rigid transmission of force from the motor shaft to the work spindle is realized in every swivel position of the housing parts in the transmission gearing.

While the prior art drills are useful, they have various limitations. For example, drills are frequently exposed to impacts, both intentional and accidental, on the bits which are held by the drills. The prior art drills generally transmit these impact forces through the gearing mechanisms which allow for the relative positioning of the work spindle with respect to the motor shaft. Accordingly, the gears must be designed to absorb the impact forces. Such gears may increase the weight of the drill and increase the size of the forward section of the drill. Increased weight increases the fatigue experienced by a user, particularly users who use the tool infrequently. Moreover, the additional bulk of the drill reduces the usefulness of the tool in confined areas.

Additionally, the locking mechanisms used to restrict articulation in prior articulating drill systems may be difficult to use or susceptible to accidental activation. Furthermore, in certain known devices the articulating gear mechanism is exposed allowing contaminants into the mechanism as well as presenting a safety concern as clothing or appendages may be caught by revolving gears.

What is needed is an articulating power hand tool which protects internal components from damage resulting from axial impact. It would be beneficial to further protect the internal components from contamination and reduce the potential for external items becoming entrapped by the internal components.

What is further needed is an articulating power hand tool with a reduced forward section and a compact articulating system to allow for use of the tool in confined areas.

What is also needed is an articulating power hand tool having a latch mechanism exhibiting increased strength and which further reduces the potential of accidental manipulation.

SUMMARY

The present invention is an articulating hand power tool. In one embodiment, the tool includes a head portion including a head housing, a bit holder rotatably positioned within the head housing, and a bearing member operable to transfer a first axial force from the bit holder to the head housing. A frame is rotatably connected to the head portion for placement in a plurality of positions with respect to the head portion and operably connected to the head housing for receiving the first axial force transferred to the head housing. The tool further includes an articulating gear system for transferring rotational force generated by a motor to the bit holder at each of the plurality of positions.

One method of transferring axial forces in an articulating power tool in accordance with the invention includes transferring an axial force from a bit holder rotatably positioned within a head housing of a tool to a bearing member, transferring the axial force from the bearing member to the head housing, and transferring the axial force from the head housing to a main housing, wherein the head housing is rotatable with respect to the main housing.

These and other advantages and features of the present invention may be discerned from reviewing the accompanying drawings and the detailed description of the preferred embodiment of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

FIG. 18 shows a side elevational view of the articulating drill of FIG. 18 with the head portion rotated to an angle of 90 degrees from the main housing portion of the drill and a portion of the main housing portion removed to show the position of the dust lid of FIG. 17;

FIG. 19 shows a side elevational view of the articulating drill of FIG. 18 with the head portion rotated to an angle of 180 degrees from the main housing portion of the drill and a portion of the main housing portion removed to show the position of the dust lid of FIG. 17;

FIG. 20 shows a detail view of the dust lid of FIG. 19;

DESCRIPTION

Figure 1:
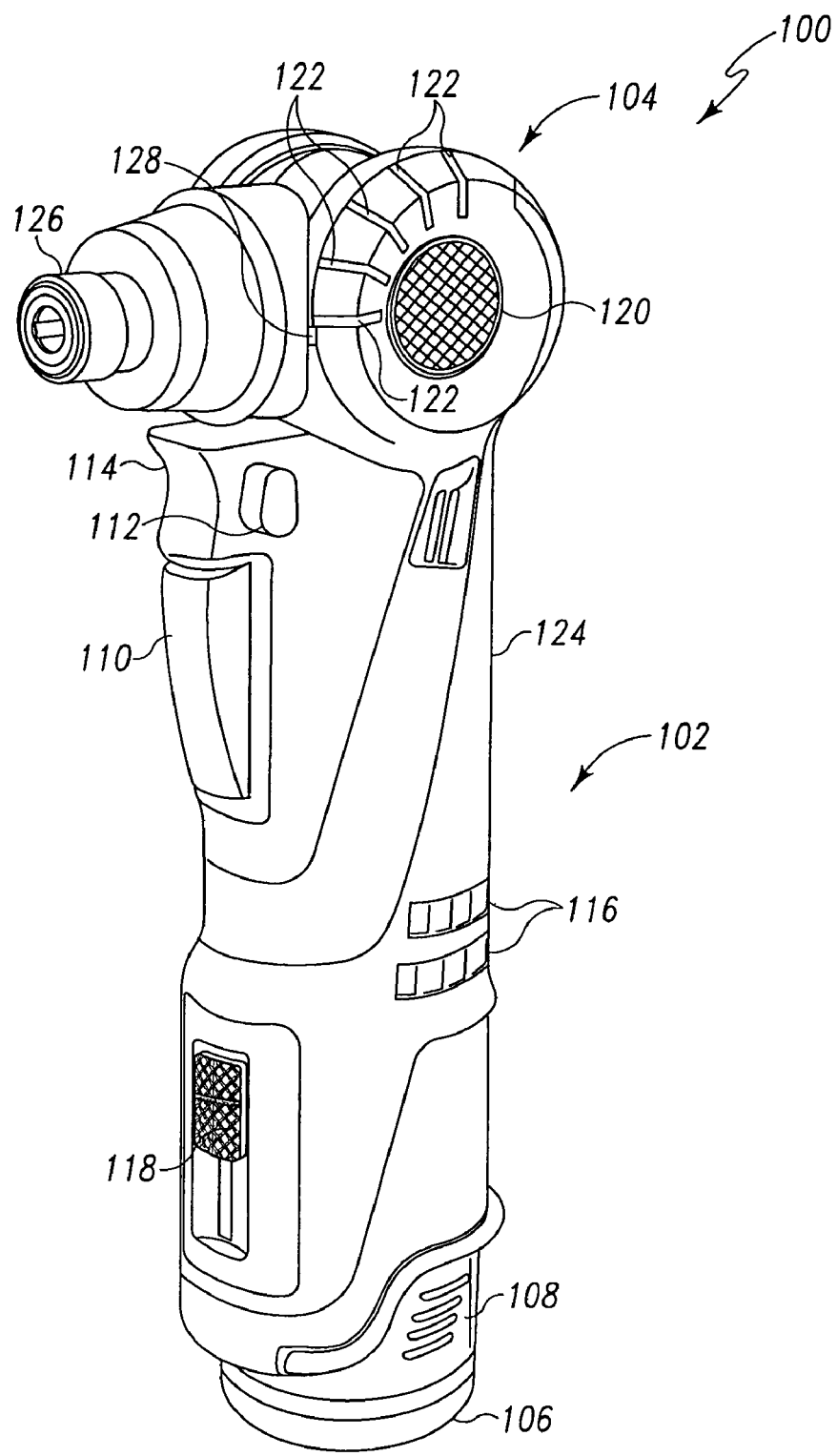
FIG. 1 shows a perspective view of an articulating drill incorporating features of the present invention.
Figure 2:
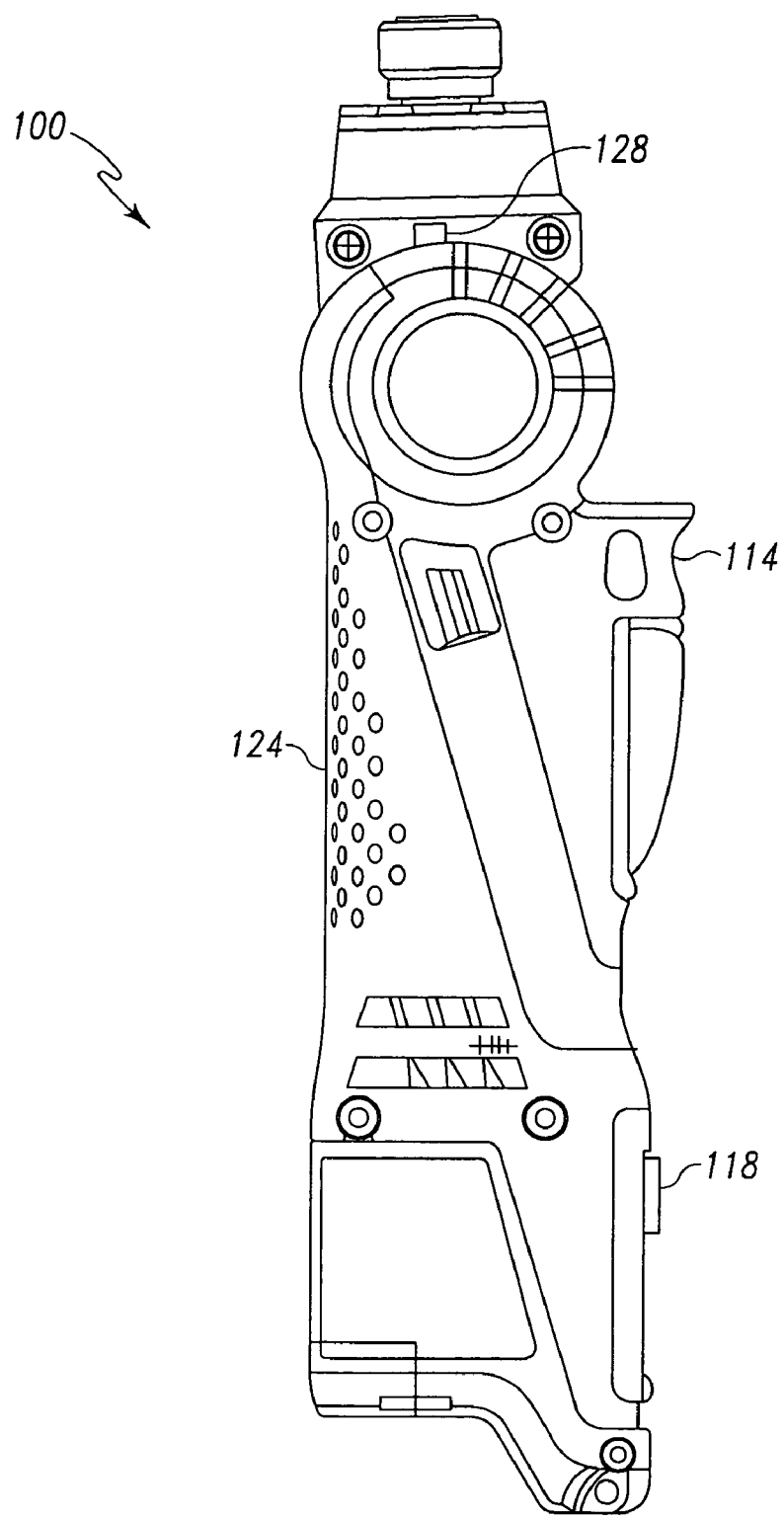
FIG. 2 shows a side elevational view of the articulating drill of FIG. 1 with the rechargeable battery pack removed.

An articulating drill generally designated 100 is shown in FIG. 1. In the embodiment of FIG. 1, the drill 100 includes a main housing portion 102 and a head portion 104. The main housing portion 102 houses a motor and associated electronics for control of the drill 100. The main housing portion 102 includes a battery receptacle for receiving a rechargeable battery pack 106 as is known in the art. In one embodiment, the rechargeable battery pack 106 comprises a lithium-ion battery. The battery pack 106 is removed by depression of the battery release tabs 108. FIG. 2 shows the drill 100 with the battery pack 106 removed. The drill 100 may alternatively be powered by an external power source such as an external battery or a power cord.

A variable speed trigger switch 110 controls the speed at which the motor rotates. The direction of rotation of the motor is controlled by a reversing button 112 which slides within a finger platform 114. Ventilation openings 116 allow for cooling air to be circulated around the motor inside of the main housing 102. A clutch control 118 sets the maximum torque that may be generated when using the drill 100. At the position shown in FIG. 1, the clutch control 118 is at the highest setting or drill mode. At the highest setting, the clutch is disabled to provide maximum torque. By sliding the clutch control 118 downwardly from the position shown in FIG. 1, a user may set a desired torque limit that is allowed to be generated by the drill 100 as discussed in more detail below.

Accordingly, at settings other than the highest setting, a torque above the setting of the clutch control 118 causes the clutch to activate.

The main housing portion 102 also includes an articulation button 120 and a plurality of angle reference indicators 122 molded onto the outer surface 124 of the main housing 102. In the embodiment of FIG. 1, there are five angle reference indicators 122 used to identify five angular positions in which the head portion 104 may be placed.

The head portion 104 includes a collet locking device 126 and an angle indicator 128. The angle at which the head portion 104 is positioned is indicated by the angle reference indicator 122 with which the angle indicator 128 is aligned. As shown in FIG. 1, the head portion 104 is at a 90 degree angle with respect to the main housing portion 102. In FIG. 2, the head portion 104 is axially aligned with the main housing portion 102. Although the embodiment of FIGS. 1 and 2 has five angle reference indicators 122, there may be additional or fewer angle reference indicators 122 and corresponding angles at which the head portion 104 may be placed with respect to the main housing portion 102.

Referring now to FIGS. 3-6, the collet locking device 126 is located around a bit holder 130 which is in turn supported by a ball bearing 132 that is fixed within a bearing pocket 134 of the head housing 136. The collet locking device 126 includes a sleeve 138 with recesses 140. A spring 142 is positioned about the bit holder 130. The bit holder 130 includes a hole 144 which receives a cylinder pin 146 and recesses 148 which receive steel balls 150.

The bearing 132 abuts the head housing 136 of the head portion 104 at the outer rear periphery of the bearing 132. More specifically, the bearing 132 abuts a flange 152. In this embodiment, the flange 152 is continuous about the housing 136, although a flange may alternatively be in the form of a plurality of fins located about the inner portion of the housing 136.

The bit holder 130 is operably coupled to a drive collet 154 which is in turn connected to an output pinion shaft 156 through a drive plate 158 which is fixedly attached to the output pinion shaft 156. A lock ring 160 surrounds the drive collet 154 and three locking pins 162. The lock ring 160, the drive collet 154, the drive plate 158, and the locking pins 162 all comprise an automatic spindle lock system such that the output bit holder 130 can only be driven from the pinion side as known in the art. When driven from the bit side, i.e., when the tool 100 is used as a manual screwdriver, the spindle lock system keeps the output pinion shaft 156 from rotating thus facilitating use of the tool 100 as a manual screwdriver. In an alternative embodiment, a manually manipulated locking device may be used.

Figures 7, 8:
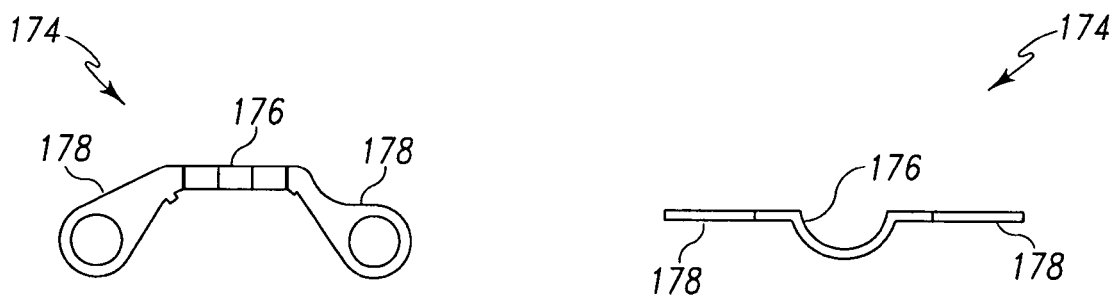
FIG. 7 shows a top plan view of a bracket used to support an output pinion shaft in the articulating drill of FIG. 1.
FIG. 8 shows a side plan view of the bracket of FIG. 7.

A pinion gear 164 is located at the opposite end of the output pinion shaft 156 from the drive plate 158. One end of the output pinion shaft 156 is maintained in axial alignment by a bearing 166 which fits within bearing pocket 168. The opposite end of the output pinion shaft 156 is supported by a sleeve 170. The sleeve 170 is supported on one side by a flange 172 on the head housing 136. On the opposite side, the sleeve 170 is supported by a bracket 174 also shown in FIGS. 7 and 8.

Figure 9:
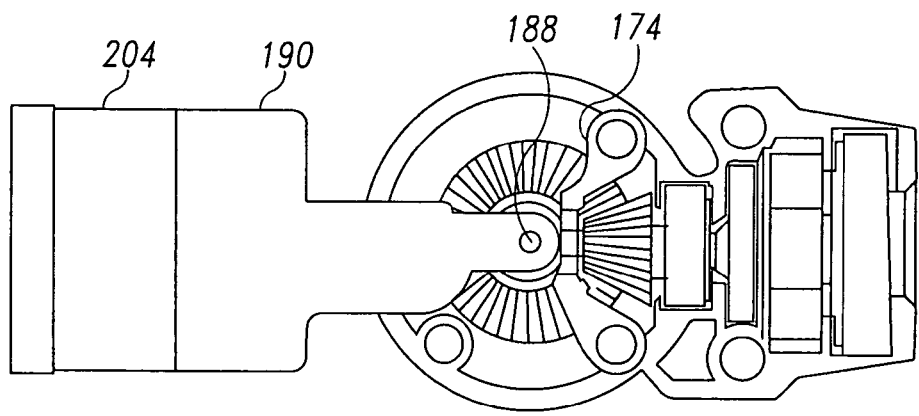
FIG. 9 shows a top elevational view of the planetary gear section, articulating section and head portion of the articulating drill of FIG. 1 with the main housing and a portion of the head housing removed.

The bracket 174 includes a support area 176 configured complimentary to a portion of the sleeve 170. Two connection arms 178 are configured to be attached to the head housing 136 as shown in FIG. 9. The bracket 174 eliminates the need to provide a matching flange for flange 172 molded into the opposite side of the head housing 136. The elimination of the need for an opposing flange allows for a significant increase in design freedom as the space requirements for the support structure for the sleeve 170 are reduced. The bracket 174 may be stamped from W108 steel to provide the needed rigidity and strength.

Figure 10:
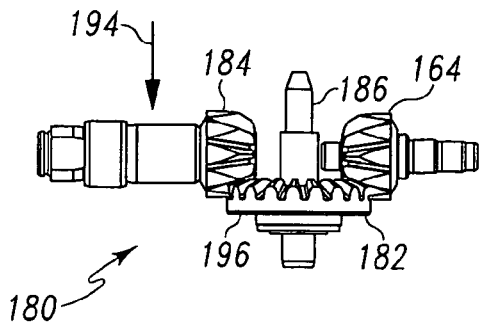
FIG. 10 shows a side elevational view of the articulating gear system of the articulating drill of FIG. 1 including a bevel gear and two pinion gears.

Referring now to FIG. 10, the pinion gear 164 forms a portion of an articulating gear system 180. The articulating gear system 180 further includes a bevel gear 182 which is engaged at the output portion of the articulating gear system 180 with the pinion gear 164 and further engaged on the motor portion by pinion gear 184. The shaft 186 of the bevel gear 182 is supported at one end within a hole 188 (see FIG. 4) of the frame 190. The frame 190 is made from a zinc and aluminum alloy ZA-8. This material provides a sufficiently low coefficient of friction to ensure relatively small frictional forces exist between the shaft 186 and the frame 190.

The shaft 186 is radially and axially supported at the opposite end by a ball bearing 192 supported by the frame 190. At this end of the shaft 186, however, comparatively larger forces are generated than at the end of the shaft 186 inserted within the hole 188. More specifically, as shown in FIG. 10, both pinion gear 164 and pinion gear 184 are located on the same side of the bevel gear 182. Accordingly, as the articulating gear system 180 rotates, a force is generated on the bevel gear 182 in the direction of the arrow 194 toward the base 196 of the bevel gear 182. This force acts to disengage the bevel gear 182 from the pinion gear 164 and the pinion gear 184. With this increased force acting upon the bevel gear 182, an unacceptable amount of axial force would be transmitted to the bearing 192. Accordingly, a thrust bearing 198 is provided to protect the ball bearing 192 and to provide a low friction support for the base 196 of the bevel gear 182. The thrust bearing 198 is made of a material with an acceptably low coefficient of friction such as oil impregnated bronze commercially available from McMaster Carr of Chicago, Ill. Accordingly, the friction generated at the base 196 of the bevel gear 182 is maintained within acceptable levels.

Referring again to FIG. 4, the pinion gear 184 is fixedly attached to a planetary gearbox shaft 200 which receives torque from a planetary gear system generally indicated as reference numeral 202. The planetary gear system 202 receives torque from a motor as is known in the art. The planetary gear system 202 is located within a planetary gear housing 204 which is inserted partially within the frame 190. This arrangement allows for the planetary gear system 202 to be separately manufactured from the other components while simplifying assembly of the planetary gear system 202 with the other components. This modularity further allows for alternative gearings to be provided in the planetary gear system 202 while ensuring a proper fit with the other components.

Figure 4:
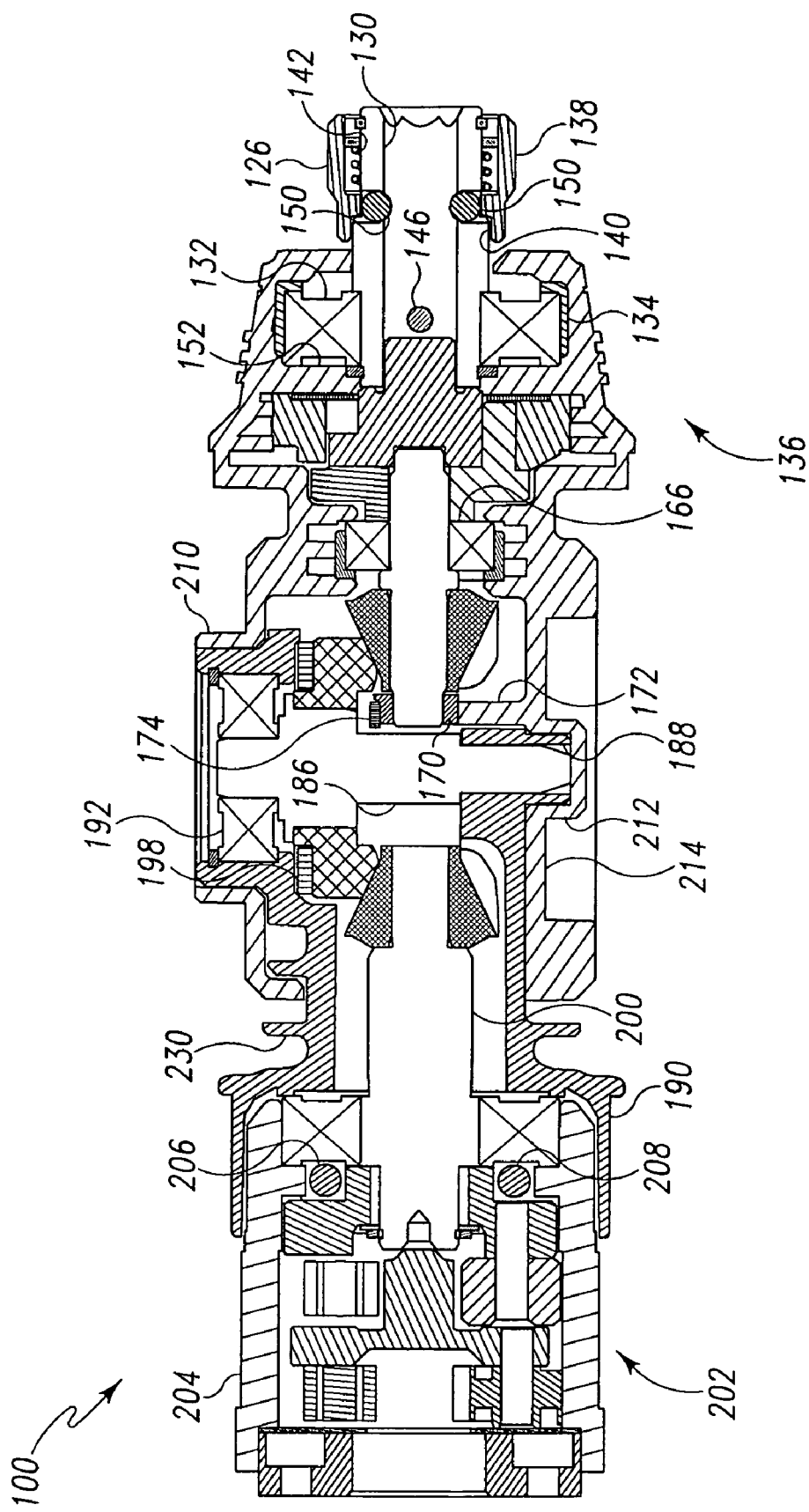
FIG. 4 shows a cross-sectional view of the head portion, the articulating gear system and the planetary gear system of the articulating drill of FIG. 1.

Generally, it may be desired to provide a simple friction fit between the planetary gear housing 204 and the frame 190. In the embodiment of FIG. 4, however, the articulating gear system 180 generates an axial force along the planetary gearbox shaft 200. This axial force acts to disengage the planetary gear housing 204 from the frame 190. Accordingly, pins 206 and 208 which extend through both the planetary gear housing 204 and the frame 190 are provided. The pins 206 and 208 ensure the planetary gear housing 204 does not become detached from the frame 190 during operation of the drill 100. Alternatively, the planetary gear housing 204 and the frame 190 may be formed as an integral unit.

Figure 11:
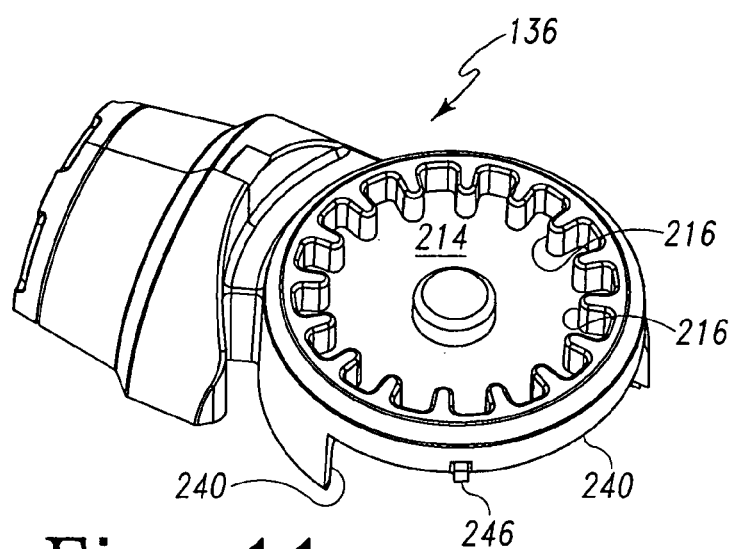
FIG. 11 is a perspective view of a portion of the head housing of the drill of FIG. 1 with a plurality of teeth in a well which are formed complimentary to teeth on the articulation button.

Continuing with FIG. 4, the frame 190 is configured to slidingly mate with the head housing 136. To this end, the head housing 136 includes a shroud portion 210 which is complimentarily formed to the frame 190 about the ball bearing 192. The head housing 136 further includes a recess 212 which is configured to receive the portion of the frame 190 which defines the hole 188. Also shown in FIG. 4 is a well 214 which includes a plurality of teeth 216 shown in FIG. 11.

Figure 12:
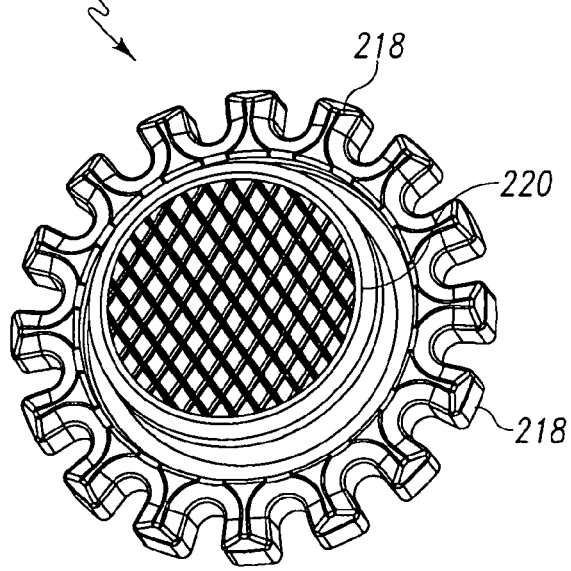
FIG. 12 shows a perspective view of the articulating button of the articulating drill of FIG. 1.
Figure 13:
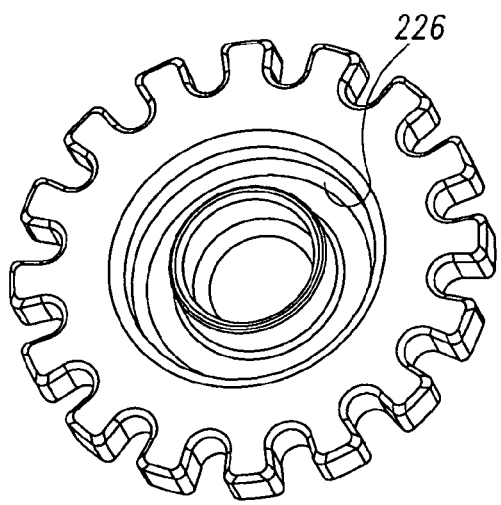
FIG. 13 shows a perspective view of the bottom of the articulating button of FIG. 12.
Figure 14:
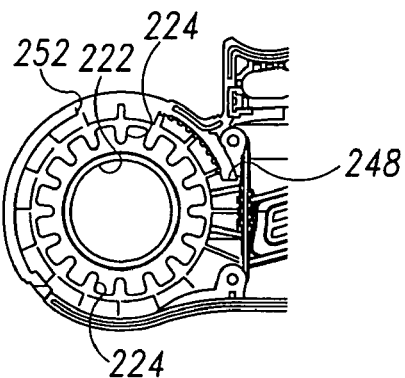
FIG. 14 shows a partial top elevational view of the inner surface of the outer housing of the articulating drill of FIG. 1 with teeth formed complimentary to the teeth on the articulation button and a hole for receiving a raised portion of the articulating button.

With further reference to FIGS. 12-14, the well teeth 216 are formed complimentary to a plurality of teeth 218 which are formed in the articulation button 120. The articulation button 120 includes a raised center portion 220 which is configured to fit within a hole 222 in the main housing portion 102. The teeth 218 of the articulation button 120 are further configured to mesh with a plurality of teeth 224 formed on the inner side of the main housing portion 102 around the hole 222. The articulation button 120 also includes a spring receiving well 226 on the side of the articulation button 120 facing the well 214. When assembled, a spring (not shown) is located within the well 214 and extends into the spring receiving well 226 forcing the raised center portion 220 of the articulation button 120 toward a position wherein the articulation button 120 projects into the hole 222.

Figure 3:
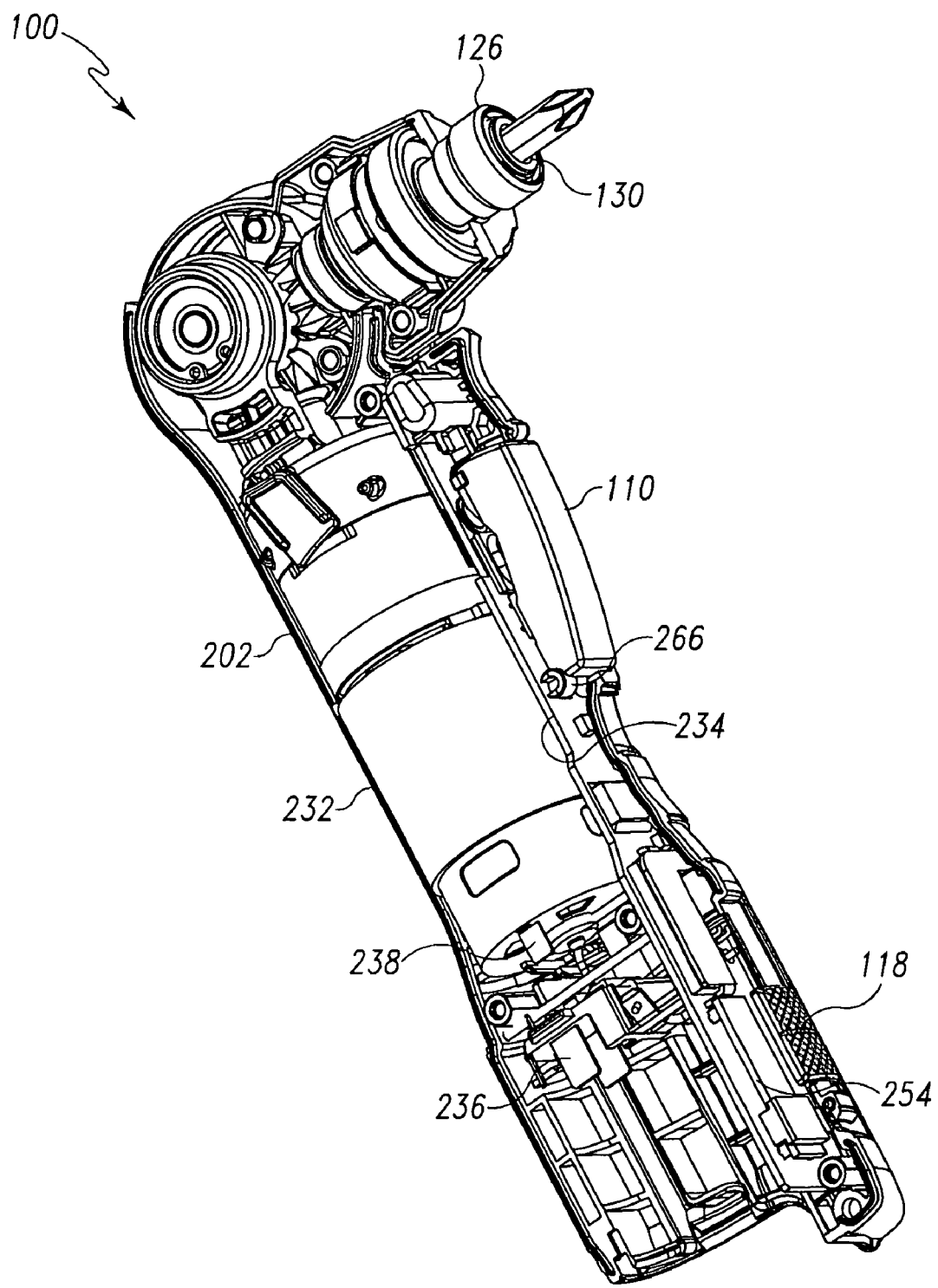
FIG. 3 shows a perspective view of the articulating drill of FIG. 1 with the battery pack, a portion of the main housing cover, and a portion of the head housing removed and a bit in the bit holder.
Figure 15:
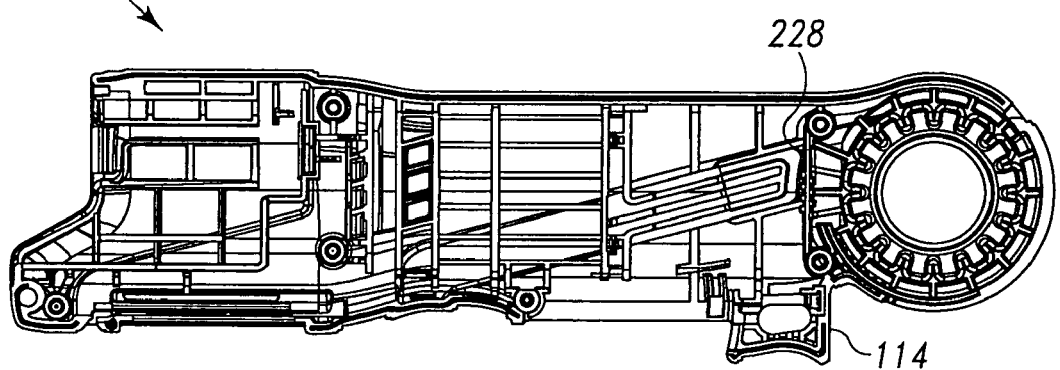
FIG. 15 shows a top elevational view of the inner surface of the outer housing of the articulating drill of FIG. 1.

Referring to FIGS. 4 and 15, the frame 190 is supported axially in the main housing portion 102, which in this embodiment is made of plastic, by a rib 228. The rib 228 lies beneath a fin 230 of the frame 190 when the frame 190 is installed in the main housing portion 102 as shown in FIG. 3. The planetary gear system 202 is mechanically secured to a motor 232 which is itself electrically connected to a printed circuit board 234 which in turn is electrically connected to a battery contact holder 236. The contact holder 236 mates with battery pack receptacles on the battery pack 106 and transmits battery power to the electronic circuit board 234 through lead wires (not shown). Another pair of lead wires (not shown) extend from the circuit board 234 to the motor terminals 238 to deliver the required voltage level to the motor 232.

Figure 5:
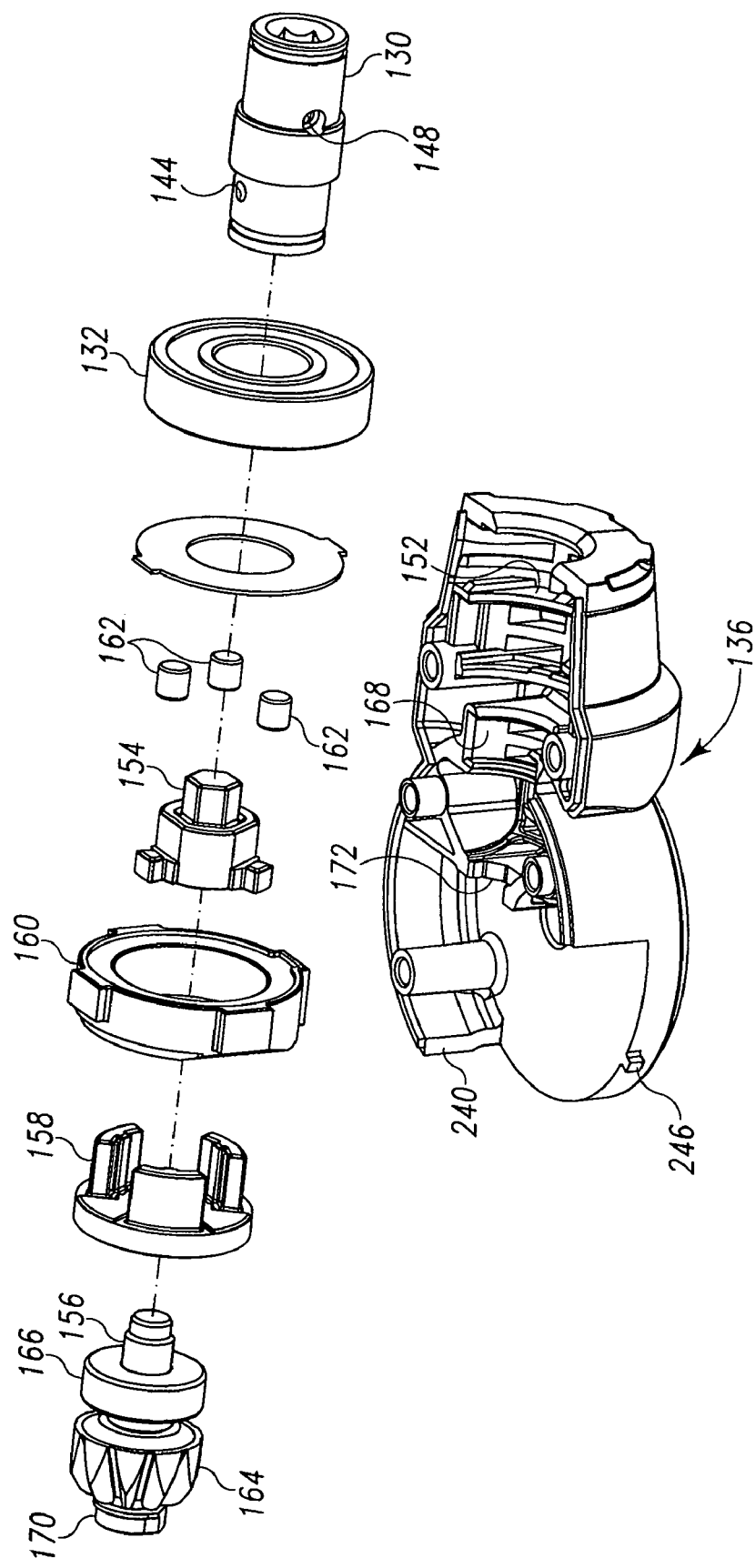
FIG. 5 shows an exploded perspective view of the head portion, including an automatic spindle lock system, of the articulating drill of FIG. 1.
Figure 6:
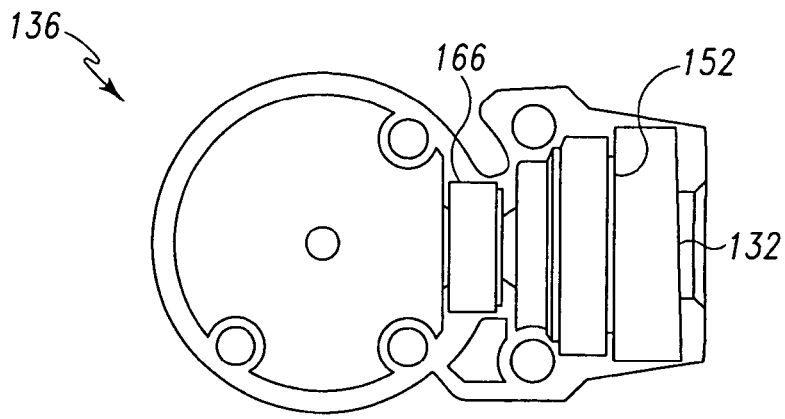
FIG. 6 shows a top plan view of the head portion of the drill of FIG. 1 with some components located within bays in the head housing.
Figure 16:
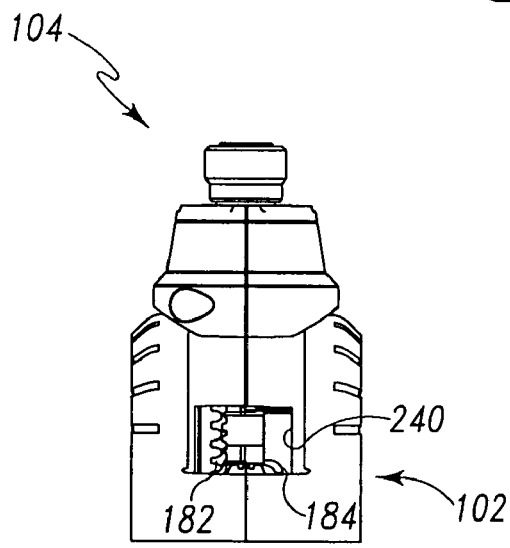
FIG. 16 shows a partial plan view of the articulating drill of FIG. 1 with the head portion aligned with the main housing portion and without a dust lid.
Figure 17:
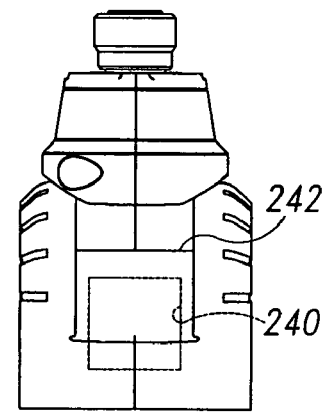
FIG. 17 shows a partial plan view of the articulating drill of FIG. 1 with the head portion aligned with the main housing portion with a dust lid.
Figure 21:
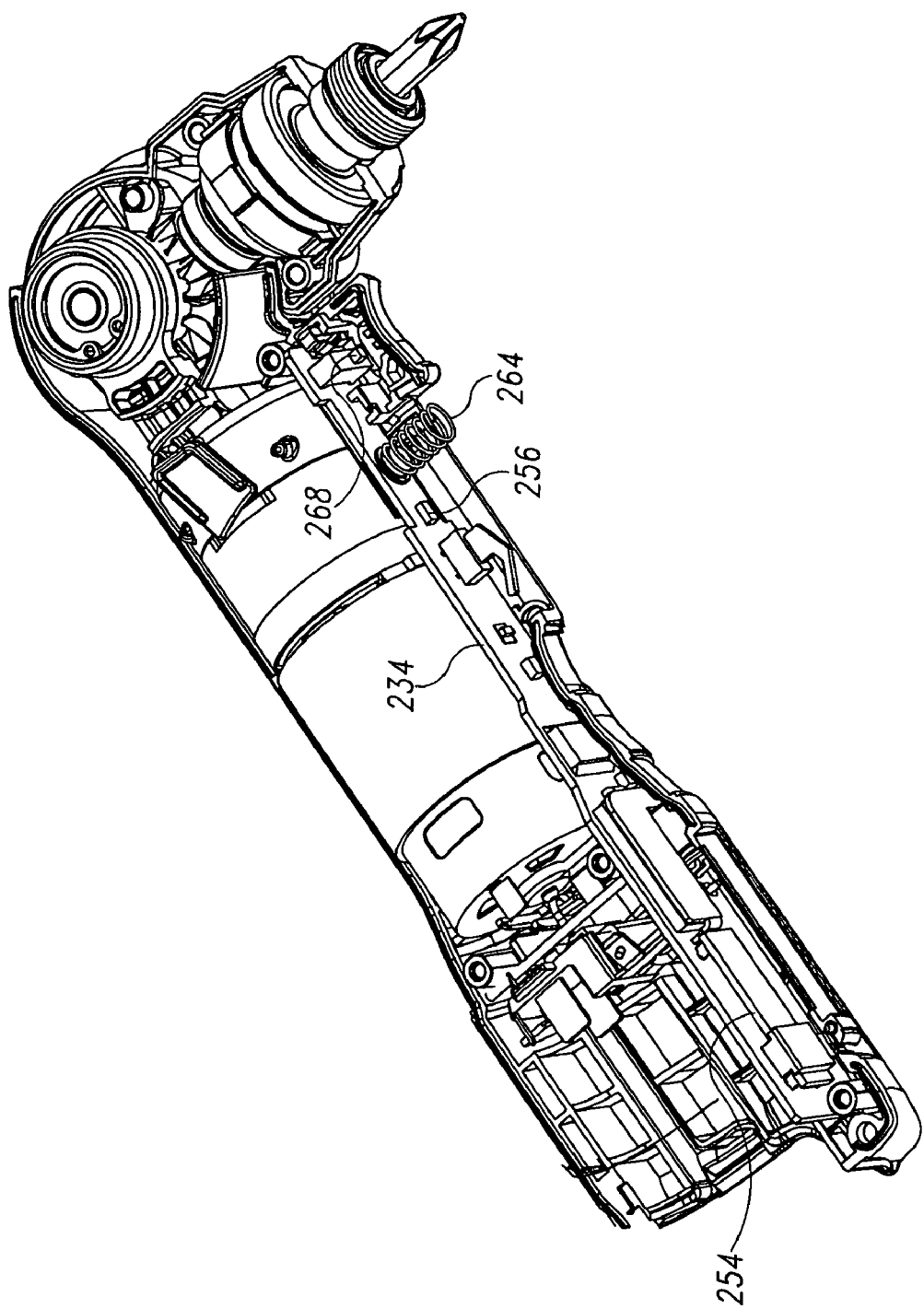
FIG. 21 shows a perspective view of the articulating drill of FIG. 1 with the variable speed trigger switch, clutch control and a portion of the main housing removed.
Figure 22A:
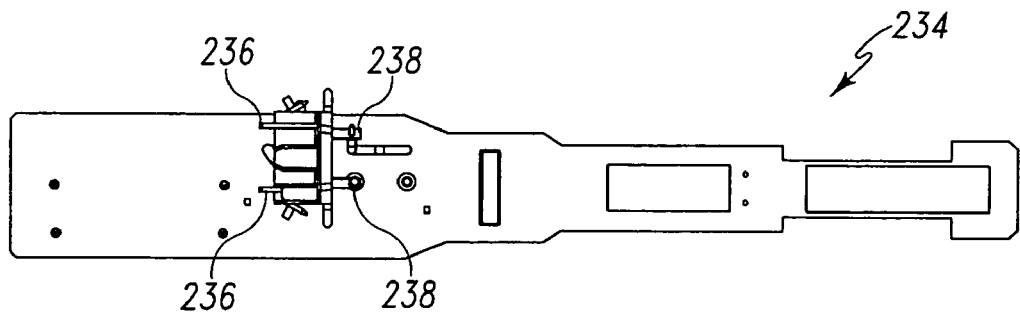
FIGS. 22a, 22b and 22c show various views of a printed circuit board of the articulating drill of FIG. 1 in accordance with principles of the invention.
Figure 22B:
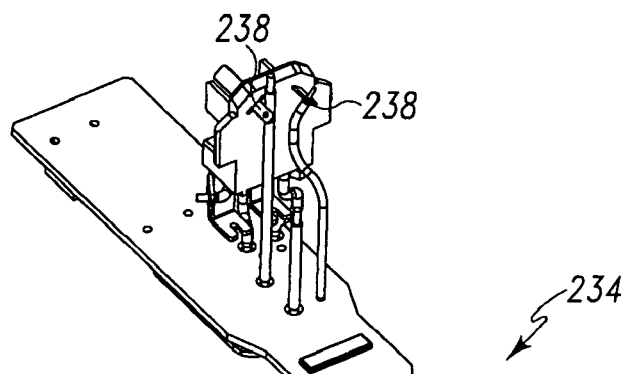
Figure 22C:
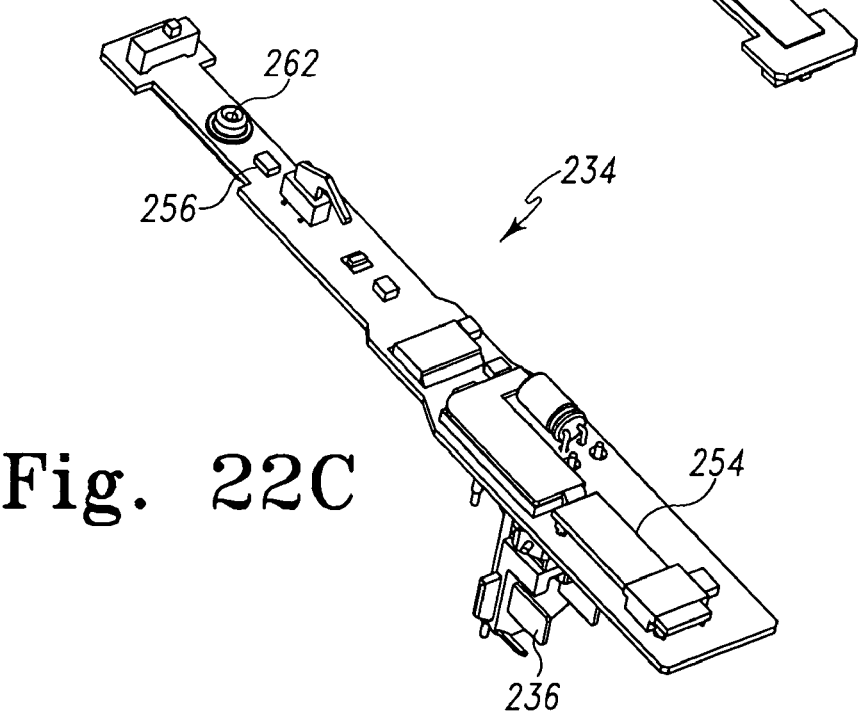

Referring now to FIG. 5, a gap 240 is provided in the portion of the head housing 136 surrounding the bevel gear 182 which allows the head housing 136 to be rotated with respect to the main housing portion 102 while the pinion gear 164 remains engaged with the bevel gear 182. When the head portion 104 is axially aligned with the main housing portion 102, however, the gap 240 is exposed as shown in FIG. 16. The articulating gear system 180 is thus exposed allowing contaminants access to the articulating gear system 180 which could foul the articulating gear system as well as presenting a safety concern since clothing, fingers or hair could become enmeshed in the articulating gear system 180. Accordingly, a floating dust lid 242 shown in FIG. 17 is used to prevent contamination of the articulating gear system 180 and to avoid exposure of moving gears to an operator through the gap 240, particularly when the head housing 136 is axially aligned with the main housing portion 102 as shown in FIG. 17.

The dust lid 242 is located in a channel 244 defined by the main housing portion 102 and the head housing 136 as shown in FIGS. 18-20. The position of the dust lid 242 at the lower portion (as depicted in FIGS. 18 and 19) of the channel 244 is constrained either by a movable dust lid travel limiter 246 positioned on the head housing 136, shown most clearly in FIGS. 11 and 20, or by a portion 248 of the frame 190. The position of the dust lid 242 at the upper portion of the channel 244 is constrained either by a neck portion 250 of the head housing 136 or by a lip 252 in the main housing portion 102.

Referring now to FIGS. 3, and 21-23, the clutch control 118 is mechanically interfaced with a linear potentiometer 254 on the circuit board 234. Also located on the circuit board 234 is a light sensor 256 which is covered by a collapsible rubber boot 258 which is in turn mechanically fastened to the variable speed trigger 110. A reflective surface 260 (see FIG. 24) is located on the inside of the rubber boot 258. A plastic spring locating member 262 which is mechanically secured to the circuit board 234 serves to locate and support a spring 264 which is mechanically fastened to the variable speed trigger 110. The spring 264 biases the variable speed trigger 110 in a direction away from the circuit board 234 about a pivot 266. The circuit board 234 also contains a two position slide switch 268 which is mechanically interfaced to the reversing button 112.

Manipulation of the variable speed trigger 110 about the pivot 266 changes the position of the reflective surface 260 relative to the light sensor 256 to produce a variable speed control signal. While the embodiment of tool 100 incorporates an optical signal generator and receiver for provision of a variable speed control signal, such a tool may alternatively use a pressure transducer, a capacitive proximity sensor, or an inductive proximity sensor. In these alternative embodiments, a pressure sensing switch for generating the variable motor speed control signal may include a pressure transducer for generating a variable speed control signal that corresponds to a pressure applied to the pressure transducer directly by the operator or through an intermediate member such as a moveable member that traverses the distance between the stop position and the full speed position.

An embodiment of the variable motor speed control signal implemented with a capacitive proximity sensor may include a capacitive sensor that generates a variable speed control signal that corresponds to an electrical capacitance generated by the proximity of an operator's finger or moveable member's surface to the capacitive sensor. An embodiment implemented with an inductive proximity sensor generates a variable speed control signal that corresponds to an electrical inductance generated by the proximity of an operator's finger or moveable member's surface to the inductive sensor.

Figure 23:
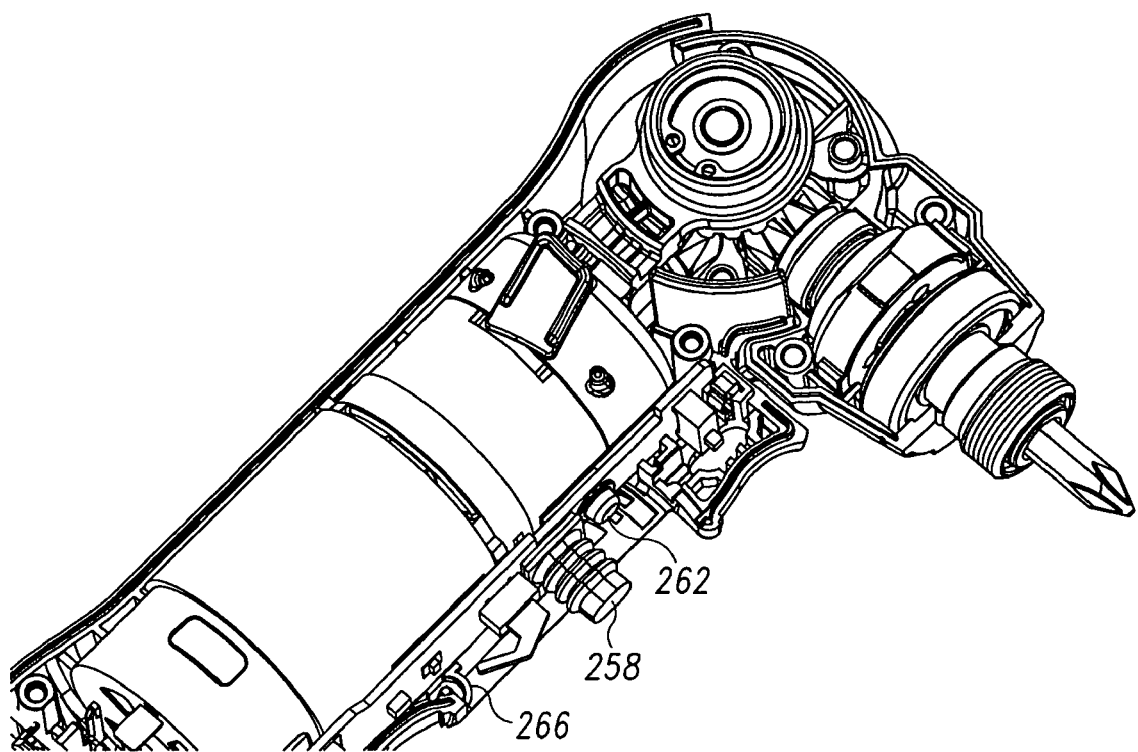
FIG. 23 shows a perspective view of the articulating drill of FIG. 21 with a collapsible boot with an internal reflective surface installed over a light generator and a light sensor.

Referring to FIG. 23, the variable speed control circuit 270 of the tool 100 is schematically shown. The variable speed control circuit 270 includes a power contact 272 which is operably connected to the variable speed trigger switch 110. An optical signal generator 274 is coupled to the battery 106 and arranged on the circuit board 232 such that light emitted from the optical signal generator 274 is directed toward the reflective surface 260 of the variable speed trigger switch 110 and directed toward the light sensor 256.

The light sensor 256 and the optical signal generator 274 may be located in the same housing or each may be within a separate housing. When the two components are located in the same housing, the light generator and sensor may emit and receive light through a single sight glass in the housing. Alternatively, each component may have a separate sight glass. An integrated component having the light generator and sensor in a single housing is a QRD1114 Reflective Object Sensor available from Fairchild Semiconductor of Sunnyvale, Calif. Such a housing is substantially smaller than a potentiometer that has a wiper, which traverses approximately the same distance as the trigger traverses from the stop to the full speed position.

The optical signal generator 274 and the light sensor 256 may be an infrared light emitter and an infrared light receiver. In an alternative embodiment, an IR transceiver may be contained within a flexible dust cover that is mechanically fastened to the back of the variable speed trigger switch. In such an embodiment, the inside of the cover in the vicinity of the moveable trigger reflects the optical signal to the receiver for generating the speed control signal.

Control of a tool incorporating the light sensor 256 may be adversely affected by external energy sources such as the sun. Accordingly, in one embodiment, the collapsible boot or dust cover 258 is made from an opaque material or coated with an opaque material such that energy from the sun which may leak past the housing and trigger arrangement does not affect the signal received by the light sensor 256. Alternatively, a light sensor that is sensitive to a specific frequency band may be used with a device which shields the light sensor from only that specific frequency band. In further embodiments, other circuitry or coding which uniquely identifies the energy from the reflected signal from interfering energy may be used.

The light sensor 256 is an optical transistor having a collector 276 coupled to the battery pack 106 through the contact 272 and an emitter 278 coupled to electrical ground though a voltage divider 280 and a capacitor 282. A timing signal generator 284 receives voltage from the voltage divider 280. In the tool 100, the timing signal generator 264 is a commonly known 555 timer, although other timing signal generators may be used.

The output of the timing signal generator 264 is coupled to a gate 286 of a MOSFET 288 that has a drain 290 coupled to one of the motor terminals 238 and a source 292 coupled to electrical ground. The other motor terminal 238 is coupled to the battery pack 106 through the contact 272. A freewheeling diode 294 is coupled across the motor terminals 238. A bypass contact 296, which is operatively connected to the variable speed trigger switch 110, is located in parallel to the MOSFET 288 between the motor terminal 238 and electrical ground and a brake contact 298 is in parallel with the freewheeling diode 294.

Figure 24:
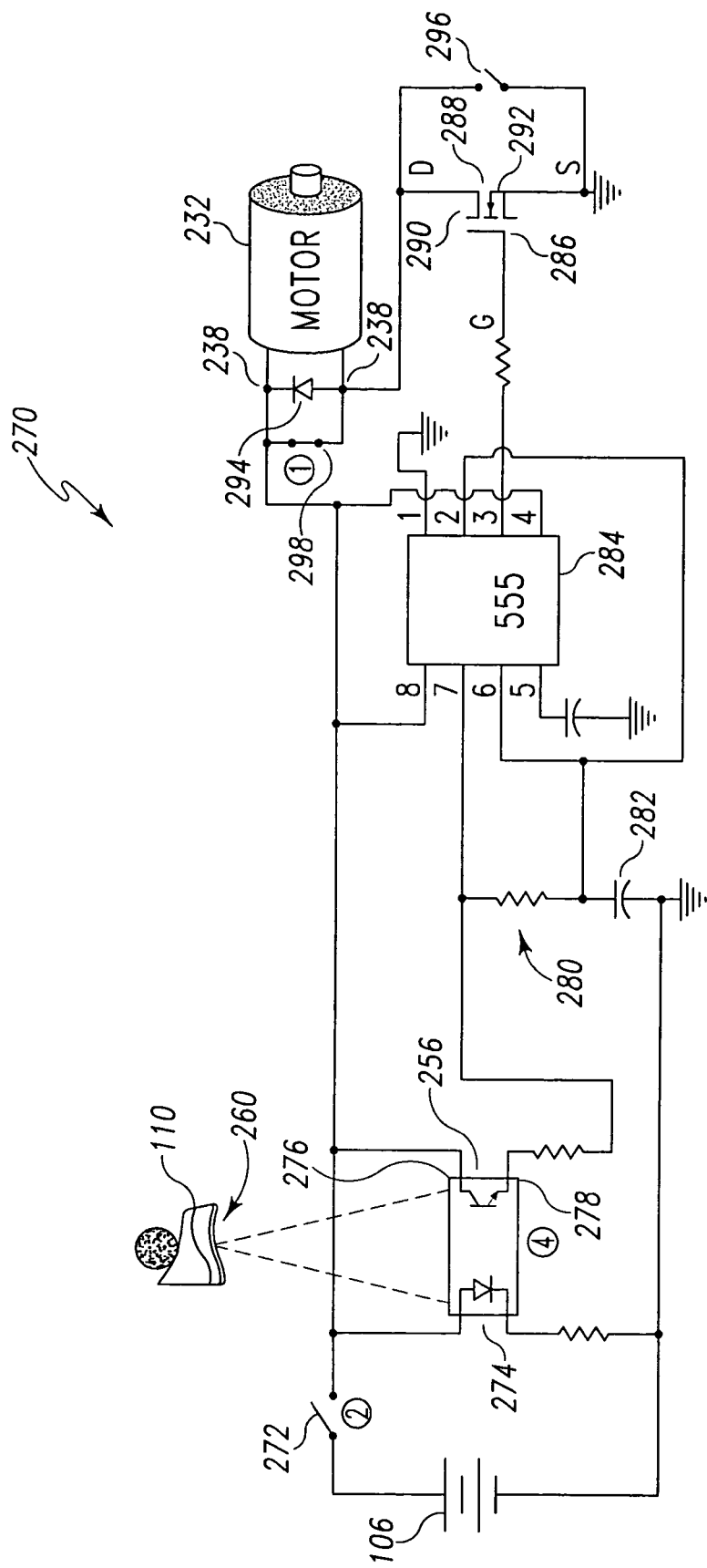
FIG. 24 shows a schematic/block diagram of the drill of FIG. 1 incorporating an optical switch for motor speed control.
Figure 25:
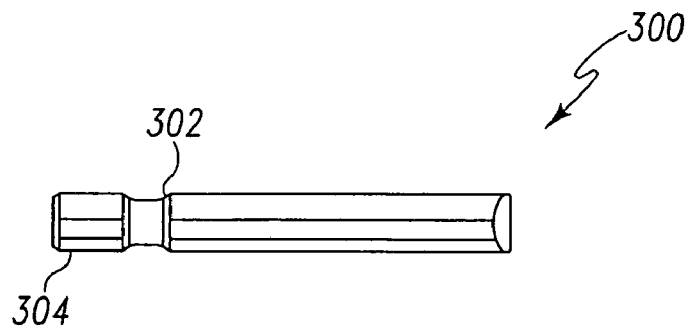
FIG. 25 shows a side elevational view of a drill bit in the form of a screw driver bit that may be used with the articulating drill of FIG. 1.
Figure 26:
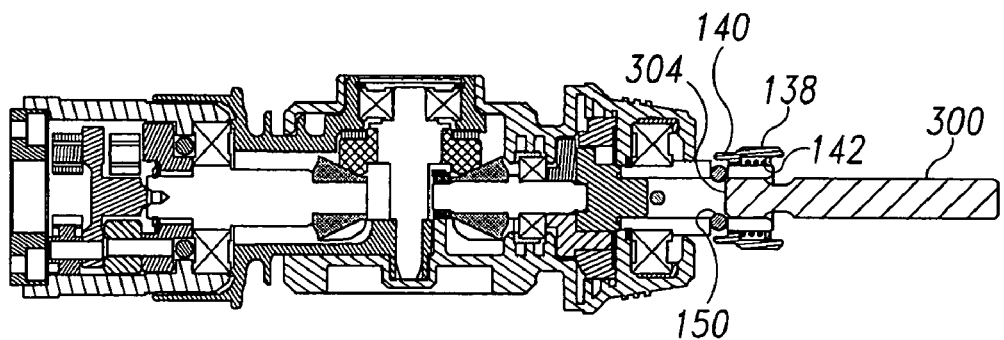
FIG. 26 shows a cross-sectional view of the drill bit of FIG. 25 being inserted into the articulating drill of FIG. 1.

Operation of the drill 100 is explained with initial reference to FIGS. 24-26. The collet locking device 126 is configured to operate with bits such as the screw driver bit 300 shown in FIG. 24. The screw driver bit 300 and the bit holder 130 are complimentarily shaped. In this example, both the screw driver bit 300 and the bit holder 130 are generally hexagonal in shape, although alternative shapes may be used. The screw driver bit 300 has a diameter slightly less than the bit holder 130 so that it may fit within the bit holder 130. The screw driver bit 300 includes a notched area 302 and a tail portion 304.

Initially, the sleeve 138 is moved to the right from the position shown in FIG. 4 to the position shown in FIG. 26 thereby compressing the spring 142. As the sleeve 138 moves, recesses 140 in the sleeve 138 are positioned adjacent to the recesses 148 in the bit holder 130. Then, as the screw driver bit 300 is moved into the bit holder 130, the tail portion 304 forces the steel balls 150 toward the recesses 140 and out of the channel of the bit holder 130, allowing the tail portion 304 to move completely past the steel balls 150.

Figure 27:
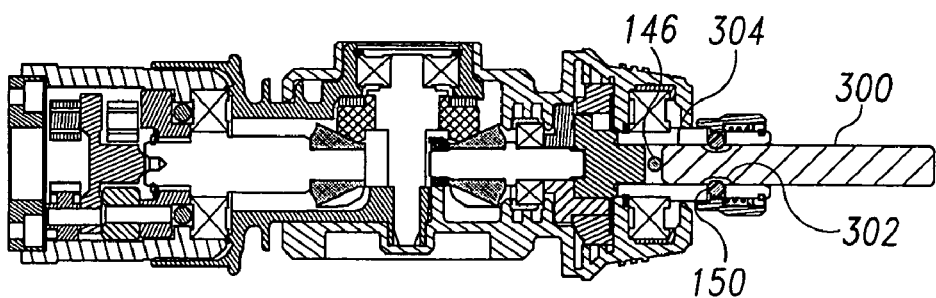
FIG. 27 shows a cross-sectional view of the drill bit of FIG. 25 inserted into the articulating drill of FIG. 1.

At this point, the notched area 302 is aligned with the recesses 148. The sleeve 138 is then released, allowing the spring 142 to bias the sleeve 138 onto the bit holder 130 which is to the left from the position shown in FIG. 27. As the sleeve 138 moves, the recesses 140 are moved away from the recesses 148 thereby forcing the steel balls 150 partially into the channel of the bit holder 130 as shown in FIG. 27. Movement of the steel balls 150 into the channel of the bit holder 130 is allowed since the notched area 302 is aligned with the recesses 148. At this point, the bit 300 is firmly held within the bit holder 130.

The head housing 136 is then articulated to a desired angle with respect to the main housing portion 102. Initially, the spring (not shown) in the spring receiving well 226 forces the articulation button 120 to extend into the hole 222. Accordingly, the teeth 218 of the articulation button 120 are meshed with the teeth 224 in the main housing portion 102 as well as the teeth 216 in the well 214 of the head housing 136, thereby angularly locking the articulation button 120 (and the head housing 136) with the main housing portion 102. Additionally, the dust lid 242 is constrained at the upper portion of the channel 244 by the neck portion 250 of the head housing 136 and at the lower portion of the channel 244 by the portion 248 of the frame 190 as shown in FIG. 18.

Figure 28:
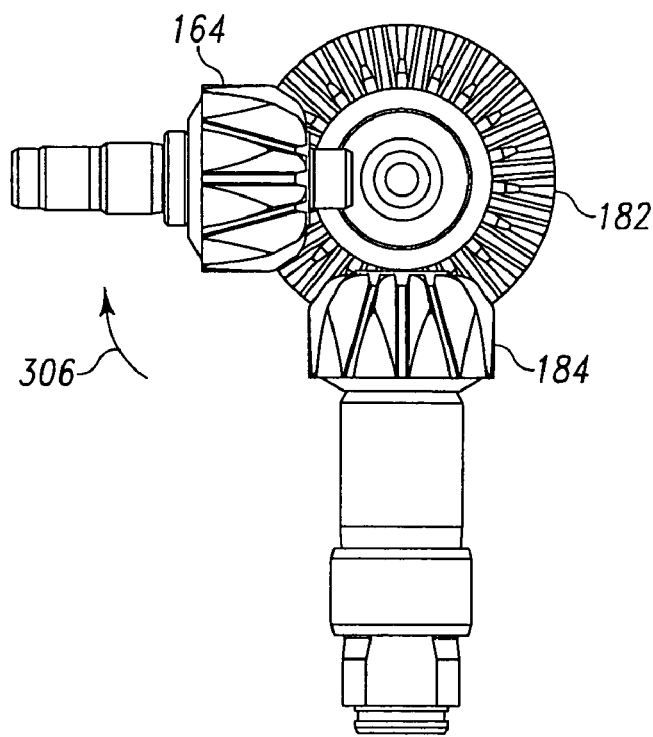
FIG. 28 shows a partial top elevational view of a bevel gear in accordance with principles of the invention with two pinion gears at a 90 degree spacing.
Figure 29:
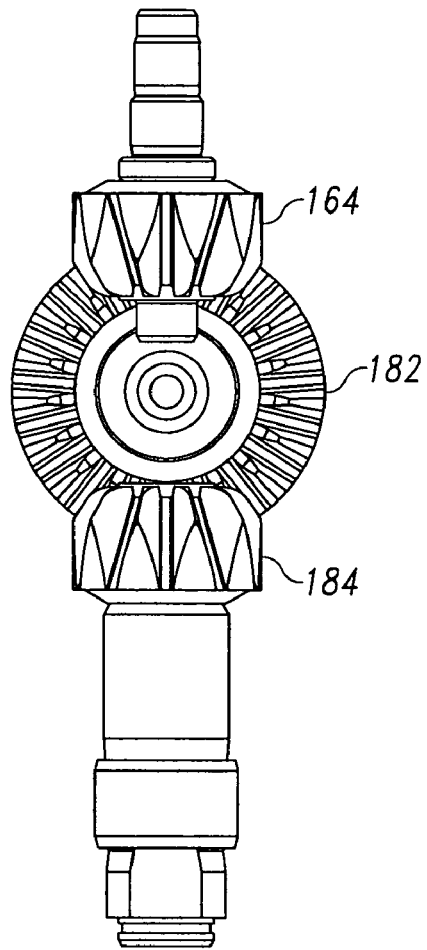
FIG. 29 shows a partial top elevational view of the bevel gear of FIG. 28 with the two pinion gears at a 180 degree spacing.

The operator then applies force to the articulation button 120 causing the spring (not shown) to be depressed thereby disengaging the teeth 218 from the teeth 224. Thus, even though the teeth 218 remain engaged with the teeth 216, the head portion 104 is allowed to pivot with respect to the main housing portion 102. As the head portion 104 is articulated, for example, from the position shown in FIG. 1 to the position shown in FIG. 2, the pinion gear 164 articulates about the bevel gear 182. By way of example, FIG. 28 shows the positions of the pinion gears 164 and 184 with respect to the bevel gear 182 when the drill 100 is in the configuration shown in FIG. 1. In this configuration, the pinion gear 164 is approximately 90 degrees away from the pinion gear 184 about the perimeter of the bevel gear 182. As the head portion 104 is articulated in the direction of the arrow 306, the pinion gear 164 articulates about the bevel gear 182 in the same direction. Thus, when the head portion 104 is aligned with the main housing portion 102, the pinion gear 164 is positioned on the bevel gear 182 at a location 180 degrees away from the pinion gear 184 as shown in FIG. 29.

Throughout this articulation, the pinion gears 164 and 184 remain engaged with the bevel gear 182. Accordingly, the bit holder 130 may be rotated by the motor 232 as the head housing 136 is articulated. Additionally, the articulation of the head housing 136 causes the movable dust lid travel limiter 246 to contact the dust lid 242 and push the dust lid 242 along the channel 244. Thus, the dust lid 242, which is configured to be wider than the gap 240 as shown in FIG. 17, restricts access from outside of the drill 100 to the articulating gear system 180.

When the articulating drill 100 is rotated to the desired location, the operator reduces the force applied to the articulating button 120. The spring (not shown) in the spring receiving well 226 is then allowed to force the articulation button 120 away from the well 214 until the articulation button 120 extends through the hole 222. Accordingly, the teeth 218 of the articulation button 120 are meshed with the teeth 224 in the main housing portion 102 as well as the teeth 216 in the well 214 of the head housing 136, thereby angularly locking the articulation button 120 (and the head housing 136) with the main housing portion 102.

The desired direction of rotation for the bit 300 is then established by placing the reversing button 112 in the position corresponding to the desired direction of rotation in a known manner. Rotation is accomplished by moving the variable speed trigger switch 110 about the pivot 266 to close the power contact 272. The closing of the contact 272 completes a circuit allowing current to flow to the optical signal generator 274 causing light to be emitted.

The emitted light strikes the reflective surface 260 and a portion of the light is reflected toward the light sensor 256. The amount of light reflected by the reflective surface 260 increases as the reflective surface 260 is moved closer to the light sensor 256. The increased light sensed by the light sensor 256 causes increased current to be conducted by the light sensor 256 and the flow of current through the light sensor 256 causes current to flow from the collector 276 to the emitter 278. Thus, as the intensity of the light impinging on the light sensor 256 increases, the current conducted by the light sensor 256 increases. This increase in current causes the voltage level presented by the voltage divider 280 to the timing signal generator 284 to increase. The increased signal is the variable speed signal and it causes the timing signal generator 284 to generate a timing signal in a known manner.

In the depicted drill 100, the timing signal generator 284 is a commonly known 555 timer, although other timing signal generators may be used.

The timing signal generator 284 generates a timing pulse having a logical on-state that corresponds to the level of the variable speed signal. This signal is presented to the gate 286 of the MOSFET 288. When the signal present at the gate 286 is a logical on-state, the MOSFET 288 couples one of the motor terminals 238 to ground while the other motor terminal 238 is coupled to battery power through the main contact 272. Thus, when the variable speed trigger switch 110 reaches a position where the light sensor 256 begins to detect reflected light and generate a variable speed signal, the timing signal generator 284 begins to generate a signal that causes the MOSFET 288 to couple one of the motor terminals 238 to ground. Once this occurs, current begins to flow through the MOSFET 288 and the motor 232 begins to rotate in the direction selected by the reversing button 112.

The freewheeling diode 294 causes appropriate half-cycles of the current in the windings of the motor 232 to flow out of the motor 232, through the diode 294, and back into the motor 232 when the MOSFET 288 does not conduct in response to the timing signal being in the off-state. This action is known as freewheeling and is well known.

When the variable speed trigger 110 is in the full speed position, the timing signal is predominantly in the on-state and the bypass contact 296 closes. The closing of the bypass contact 296 enables the battery current to continuously flow through the motor 232 so that the motor 232 rotates at the highest speed.

When rotation is no longer desired, the operator releases the variable speed trigger switch 110 and the spring 264 causes the variable speed trigger switch 110 to rotate about the pivot 266 causing the bypass contact 296 to open. Additionally, the brake contact 298 closes thereby coupling the motor terminals 238. The coupling of the two motor terminals 238 to one another through the brake contact 298 enables dynamic braking of the motor.

The electronic control of the tool 100 thus requires less space for the components that generate the variable speed signal than prior art control systems. Because the distance traveled by the variable speed trigger switch 110 does not have to be matched by the light signal generator 274 and the light sensor 256, considerable space efficiency is gained. Additionally, the light signal generator 274 and the light sensor 256 do not require moving parts, so reliability is improved as well. Advantageously, the light signal generator 274 and the light sensor 256 may be mounted on the same printed circuit board 234 on which the timing signal generator 284 is mounted.

As the drill 100 is operated, the bit 300 is subjected to axial forces. The axial forces may result from, for example, pressure applied by the operator or by an impact on the bit. In either instance, the articulating gear system 180 is protected from damage without increasing the bulk of the components within the articulating gear system 180. This is accomplished by directing axial forces from the bit 300 to the main housing portion 102 of the drill 100 while bypassing the articulating gear system. With initial reference to FIG. 27, an impact on the bit 300 tends to move the bit 300 further into the drill 100, or to the left as depicted in FIG. 27. In prior art designs, not only could such a force damage the gear system, but the steel balls used to retain the bit within the bit holder would frequently jam necessitating replacement of the collet locking device.

As shown in FIG. 27, however, the cylinder pin 146 is positioned such that the tail portion 304 of the bit 300 will contact the cylinder pin 146 before the wall of the notched area 302 contacts the steel balls 150. Thus, an axial impact will not cause the steel balls 150 to jam. Of course, the cylinder pin 146 must be made from a material sufficient to withstand the axial impact. In accordance with one embodiment, the cylinder pin 146 is made of AISI 4135 steel.

Referring now to FIG. 4, in the event of an axial impact, the force is transferred from the cylinder pin 146 to the to the bit holder 130. The axial force is transmitted from the bit holder 130 to the bearing 132 which is located within the bearing pocket 134. Accordingly, the axial force is transferred into the flange 152 (see also FIG. 5) of the head housing 136. The head housing 136 in this embodiment is made from aluminum alloy A380 so as to be capable of receiving the force transmitted by the bearing 132. The force is subsequently transferred to the frame 190 and into the rib 228 of the main housing portion 102.

More specifically, two paths for the transfer of axial forces are provided around the articulating gear system 180. The first path predominantly transfers axial forces when the head housing 136 is axially aligned with the main housing portion 102. In this configuration, axial forces pass from head housing 136 to the frame 190 primarily through the recess 212 where the head housing 136 engages the frame 190 about the hole 188 (see FIG. 4) and at the shroud portion 210 where the head housing 136 engages the frame 190 outwardly of the base of the bevel gear 196.

The second path predominantly passes axial forces when the head housing 136 is at a ninety degree angle with respect to the main housing portion 102. In this configuration, axial forces are again transferred from the cylinder pin 146 to the to the bit holder 130. The axial forces then pass primarily from the teeth 216 in the well 214 of the head housing 136 to the teeth 218 on the articulation button 120 and then to the teeth 224 in the main housing portion 102.

When the head housing 136 is neither completely aligned with the main housing portion 102 or at a ninety degree angle with respect to the main housing portion 102, axial forces generally pass through both of the foregoing pathways. Accordingly, the effect of axial forces on the articulating gear system 180 of the drill 100 are reduced. Because the articulating gear system 180 is thus protected, the articulating gear system 180 may be constructed to be lighter than other articulating gear systems.

Figure 30:
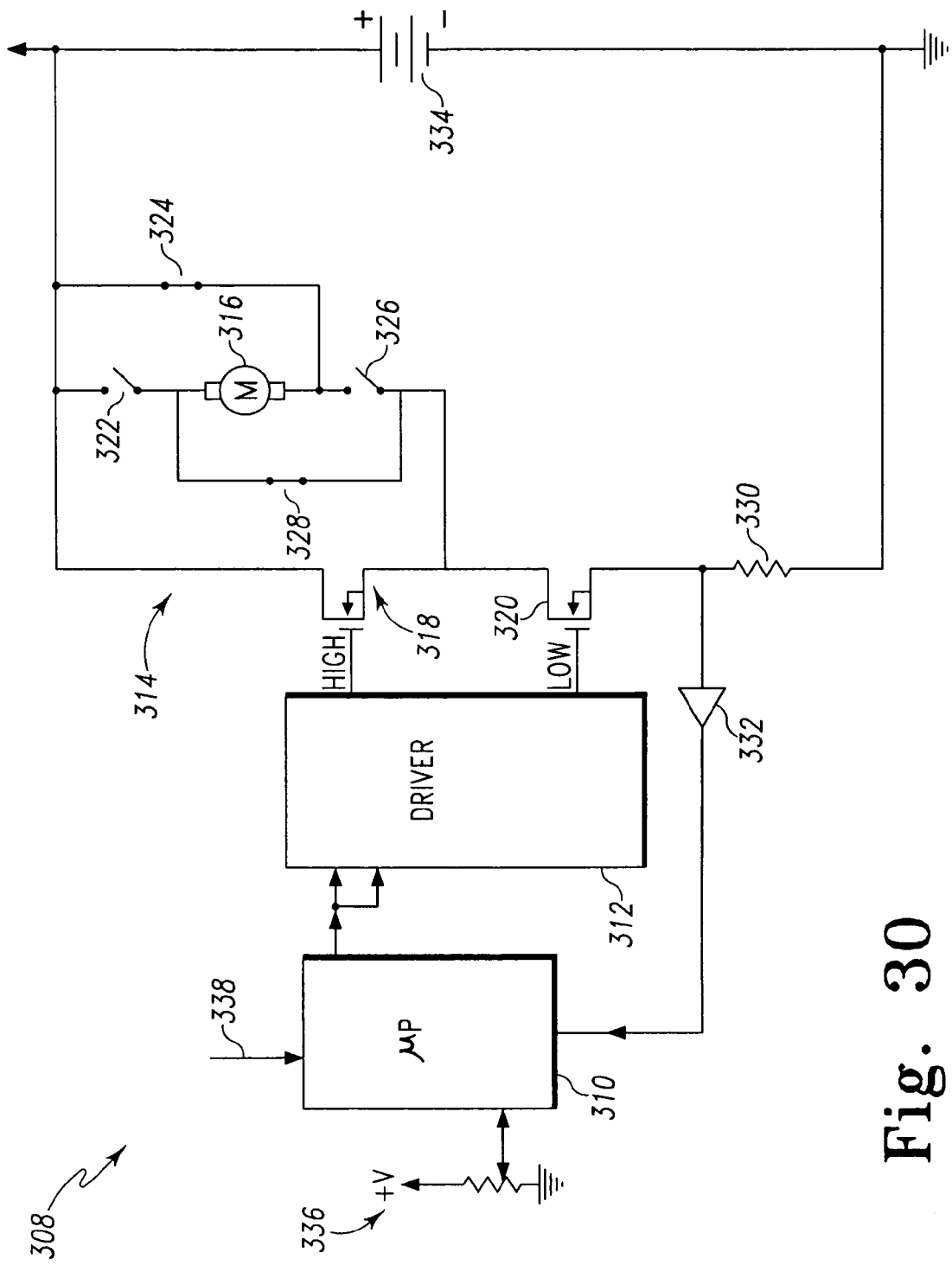
FIG. 30 shows an electrical diagram/schematic of a powered tool that dynamically brakes the tool motor using a motor interface circuit having a half bridge to provide vibratory feedback to the operator that the torque limit has been reached.

In one embodiment, a printed circuit board which may be used in the drill 100 or another power tool includes a circuit that provides vibratory feedback to the operator as shown in FIG. 30. The vibratory feedback circuit 308 includes a microcontroller 310, a driver circuit 312, and motor interface circuit 314. The driver circuit 312 in this embodiment is an integrated circuit that generates driving signals for a half-bridge circuit from a single pulse width modulated (PWM) signal, a torque limit indicating signal, which may be the same signal as the PWM signal, and a motor direction control signal. The driver circuit 312 may be a half bridge driver, such as an Allegro 3946, which is available from Allegro Microsystems, Inc. of Worcester, Mass.

The output of the driver circuit 312 is connected to a motor 316 through two transistors 318 and 320 which may be MOSFETs, although other types of transistors may be used. The transistor 318 may be connected to either terminal of the motor 316 through switches 322 and 324 while the transistor 320 may be connected to either terminal of the motor 316 through switches 326 and 328. A shunt resistor 330 is coupled between the transistor 320 and electrical ground. The high potential side of the resistor 330 is coupled to the microcontroller 310 through an amplifier 332. A power source 334 is also provided in the vibratory feedback circuit 308 and a maximum torque reference signal is provided from a torque reference source 336 which may be a linear potentiometer such as the linear potentiometer 254.

The half-bridge control of the motor 316 eliminates the need for a freewheeling diode because the driver circuit 312 generates motor interface circuit signals for selectively operating the motor interface circuit 314 to control the rotational speed of the motor 316. More specifically, a variable speed control signal 338, which may be from a trigger potentiometer or the like, is provided to the microcontroller 310 for regulation of the rotation of the motor 316 by the microcontroller 310. Based upon the variable speed control signal 338, the microcontroller 310 generates a PWM signal that is provided to the driver circuit 312. In response to the PWM signal, the driver circuit 312 turns transistors 318 and 320 on and off.

During typical operations, the transistor 318 is the complement of the transistor 320 such that when the transistor 320 is on, the transistor 318 is off. The rate at which the transistor 320 is turned on and off determines the speed of motor 316. The direction of rotation of the motor 316 is determined by the position of the switches 322, 324, 326 and 328 under the control, for example, of a reversing switch.

The current through the motor 316 is provided through the transistor 320 and the resistor 330 to electrical ground when the transistor 320 is in the on-state. This current is related to the torque at which the motor 316 is operating. Thus, the voltage at the high potential side of the resistor 330 is related to the torque on the motor 316. This motor torque signal is amplified by the amplifier 332 and provided to the microcontroller 310. The microcontroller 310 compares the amplified motor torque signal to the torque limit signal established by the torque reference source 336. The torque limit signal, which may alternatively be provided by a different type of torque limit signal generator, provides a reference signal to the microcontroller 310 that corresponds to a current through the motor 316 that represents a maximum torque setting for the motor 316.

In response to the microcontroller 310 receiving a motor torque signal that exceeds the maximum torque setting for the motor 316, the microcontroller 310 generates a braking signal that is provided to the driver circuit 312. In response to the braking signal, the driver circuit 312 turns transistor 320 to the off-state and leaves transistor 318 in the on-state. This enables regenerative current to dynamically brake the rotation of the motor 316.

As dynamic braking occurs, the torque experienced by the motor 316 decreases until the sensed torque is less than the maximum torque setting for the motor 316. The microcontroller 310 then returns the transistor 320 to the on-state, thereby rotating the motor 316 and increasing the torque experienced by the motor 316. In this manner, the motor 316 alternates between rotating and dynamically braking which causes the tool to vibrate and alert the operator that the torque limit has been reached. An effective frequency for providing this vibratory feedback is 30 Hz. The torque limit indicating signal that results in this operation continues as long as the trigger remains depressed. Alternatively, the microcontroller may be programmed to generate the torque limit indicating signal for a fixed duration and then to stop to reduce the likelihood that the motor will be overpulsed.

Figure 31:
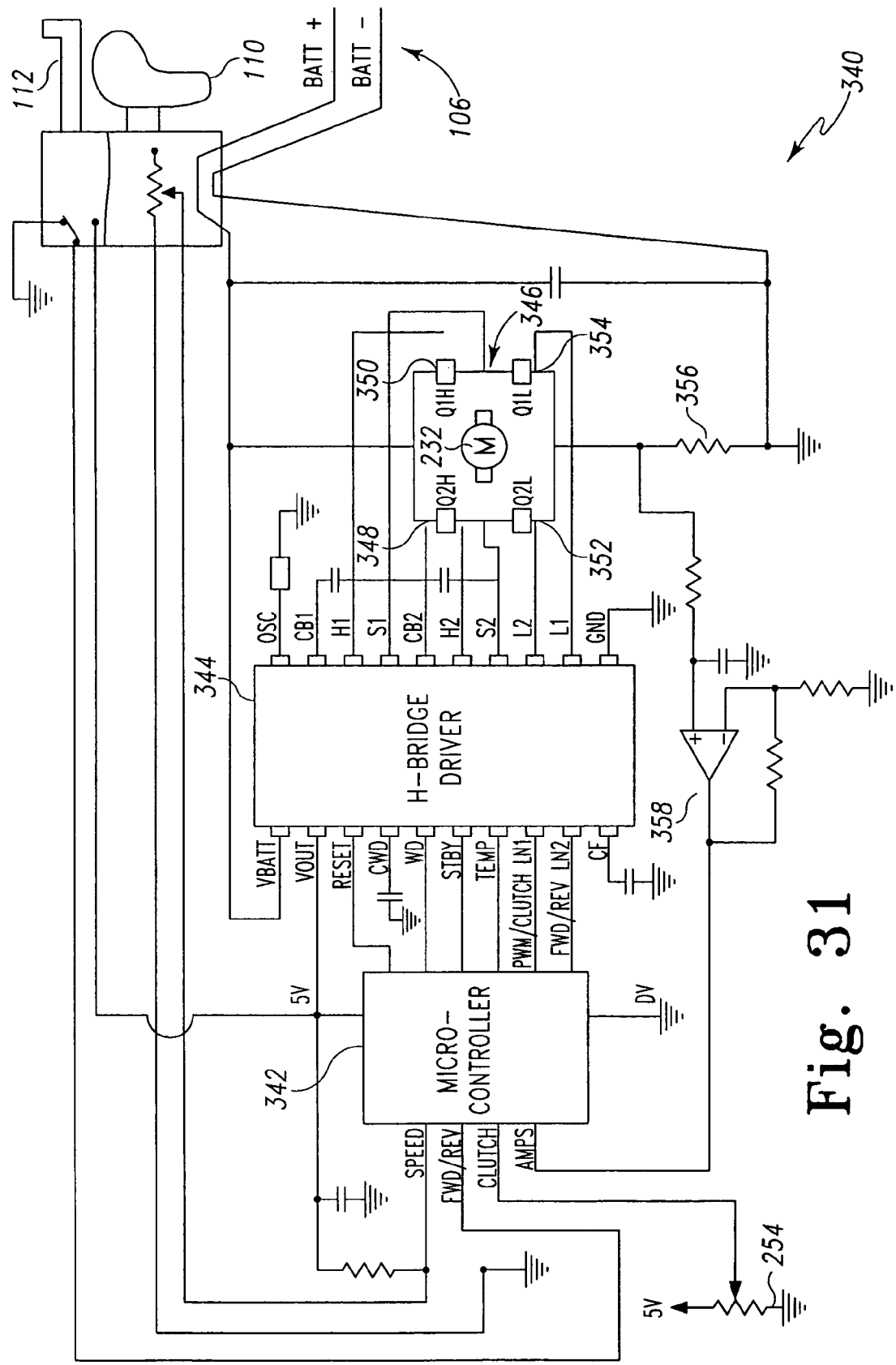
FIG. 31 shows an electrical diagram/schematic of a circuit that may be used with the drill of FIG. 1 which dynamically brakes the drill motor using a motor interface circuit having a full H-bridge circuit to provide vibratory feedback to the operator that the torque limit has been reached.

In one embodiment, vibratory feedback is provided for the drill 100 with the circuit shown in FIG. 31. The vibratory feedback circuit 340 includes a microprocessor 342, an H-bridge driver circuit 344 and a motor interface circuit 346. Four MOSFETs 348, 350, 352 and 354 control power to the motor 232 from the rechargeable battery pack 106 under the control of the H-bridge driver circuit 344. A shunt resistor 356 is provided between the MOSFETs 352 and 354 and electrical ground. The signal at the high potential side of the resistor 356 corresponds to the torque being generated by the motor 232. This motor torque signal is amplified by an amplifier circuit 358, which may be implemented with an operational amplifier as shown in FIG. 31, and provided to the microcontroller 342. The microcontroller 342 compares the motor torque signal to the torque limit signal and generates a torque limit indicating signal in response to the motor torque signal being equal to or greater than the torque limit signal. The torque limit indicating signal may have a rectangular waveform.

In one embodiment, the microcontroller 342 provides a torque limit indicating signal that is a rectangular signal having an off-state of at least 200 μseconds at a frequency of approximately 30 Hz. This torque limit indicating signal causes the driver circuit 344 to generate motor interface control signals that disconnect power from the motor 232 and couple the MOSFETs 348, 350, 352 and 354 together so the current within the windings of the motor 232 flows back through the motor 232 to dynamically brake the motor 232.

The dynamic braking causes the motor 232 to stop. Before application of the next on-state pulse, the microcontroller inverts the signal to the direction control input of the H-bridge driver 344. Thus, the subsequent on-state of the rectangular pulse causes the H-bridge driver circuit 344 to operate the H-bridge to couple the motor 232 to the rechargeable battery pack 106 with a polarity that is the reverse of the one used to couple the motor 232 and the rechargeable battery pack 106 prior to braking. This brake/reverse/start operation of the motor at the 30 Hz frequency causes the tool to vibrate in a manner that alerts the operator that the torque limit has been reached while preventing the bit from continuing to rotate during the clutching operation. The dynamic braking may also be used without inverting the signal.

In yet another embodiment, the rectangular waveform may be generated for a fixed duration, for example, 10 to 20 pulses, so the motor is not over-pulsed. Also, the microcontroller 342 may invert the direction control signal to the H-bridge driver 344 during the off-time of the rectangular waveform so that the motor 232 starts in the opposite direction each time. This action results in the net output rotation being zero during the clutching duration. Additionally, the microcontroller 342 may disable the clutching function in response to the motor direction control signal indicating reverse, rather than forward, operation of the motor 232.

Figure 32A:
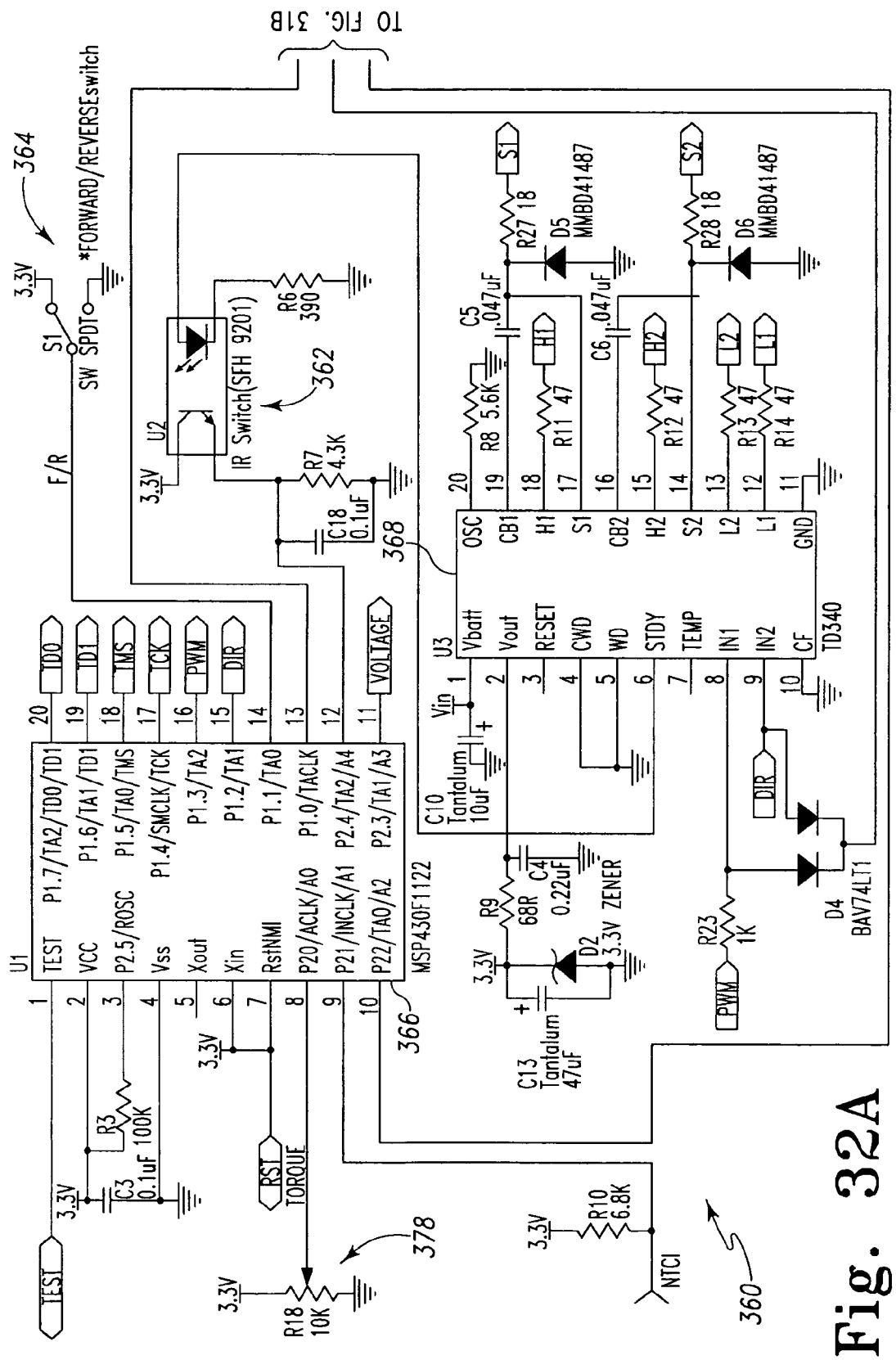
FIGS. 32A and 32B show an electrical diagram/schematic of a powered tool that provides solid state motor speed control in correspondence with a variable speed signal from an optical switch and that dynamically brakes the motor to indicate a torque limit has been reached.
Figure 32B:
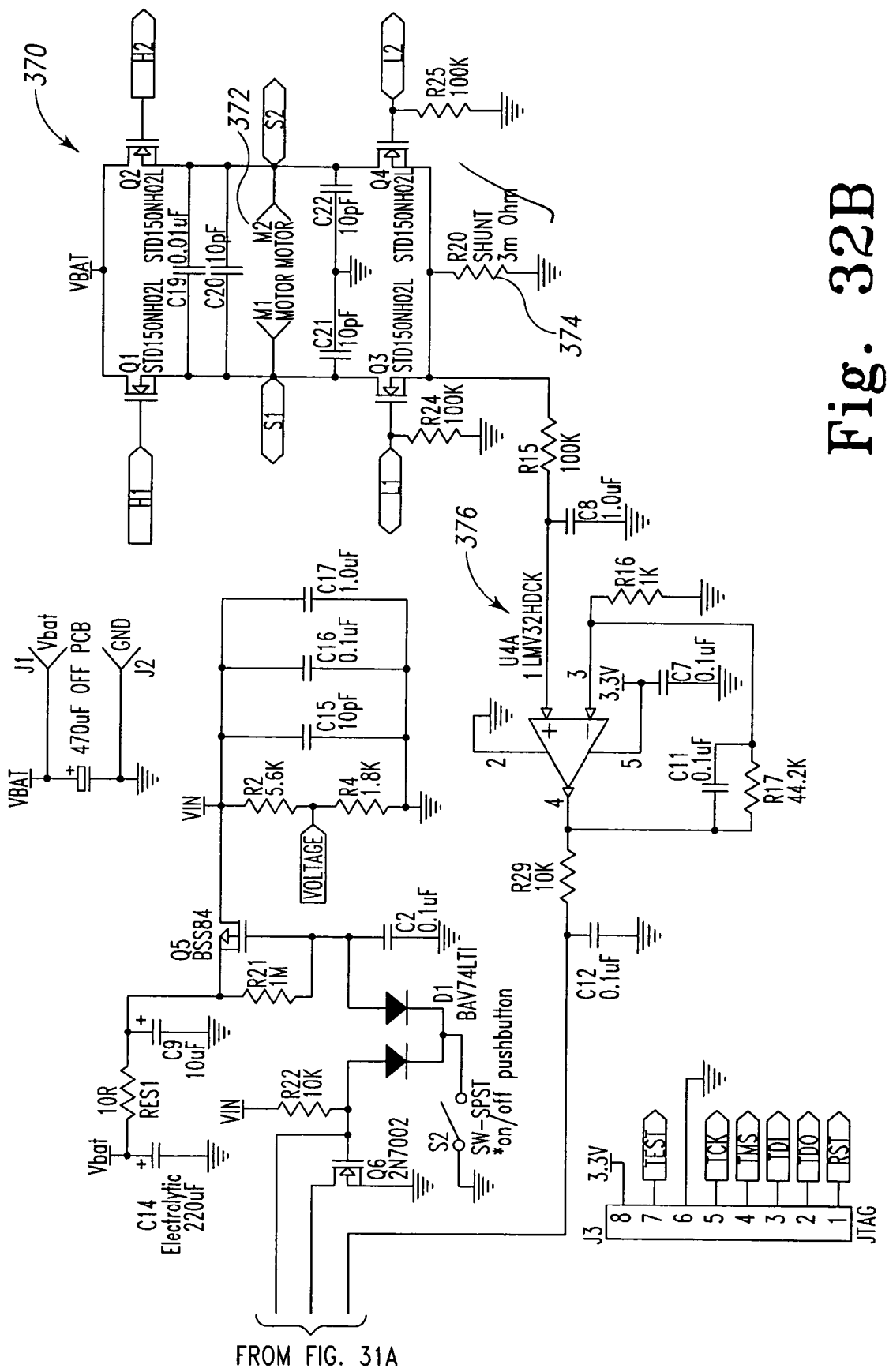

FIGS. 32A and 32B show an embodiment of a circuit used in a tool that eliminates the need for mechanical contacts. The circuit 360 includes an optical speed control switch 362, a two position forward/reverse switch 364, a microcontroller 366, a driver circuit 368, an H-bridge circuit 370, a motor 372, a shunt resistor 374, a motor torque signal amplifier 376, and a torque limit signal generator 378. In this embodiment, power is coupled to the motor 372 through the H-bridge circuit 370, but the main contact, brake contact, and bypass contact are no longer required. Thus, this embodiment significantly reduces the number of components that are subject to mechanical wear and degradation. Because the optical control switch 362, microcontroller 366, driver circuit 368, H-bridge circuit 370, and torque signal amplifier 376 may all be implemented with integrated circuits, then ICs may be mounted on a common printed circuit and the space previously occupied by the mechanical contacts and variable signal potentiometer are gained. This construction further enables the tool components to be arranged in more efficient geometries.

In the circuit 360, the optical speed control switch 362 operates as described above to generate a variable control signal from the reflection of an optical signal directed at the reflective surface of a pivoting trigger. The variable speed control signal is provided to the microcontroller 366 for processing. The microcontroller 366, which may be a microcontroller available from Texas Instruments and designated by part number MSP430, is programmed with instructions to generate a PWM pulse with an on-state that corresponds to the level of the variable speed signal. The microcontroller 366 provides the PWM signal to the driver circuit 368 for generation of the four motor interface control signals used to couple battery power to the motor 372. The direction in which the motor 372 is driven is determined by the contacts in the two position forward/reverse switch 364 through which a signal is provided to the microcontroller 366. In the circuit 360, the contacts of the two position forward/reverse switch 364 do not need to carry the current provided to the motor 372 so the contacts of the two position forward/reverse switch 364 may be smaller than contacts in other systems. The directional signal is also provided by the microcontroller 366 to the driver circuit 368 so the driver circuit 368 is capable of two directional control of current in the H-bridge circuit 370.

The motor torque signal amplifier 376 provides the torque signal from the high potential side of the shunt resistor 374 to the microcontroller 366. The torque limit signal generator 378 may be implemented with a potentiometer as described above to provide a reference signal for the microcontroller 366. When the microcontroller 366 determines that the motor torque signal equals or exceeds the motor torque limit, the microcontroller 366 generates a torque limit indicating signal so the driver circuit 368 generates the motor interface control signals that operate the motor 372 in a manner that causes vibration. For the TD340 driver circuit, the torque limit indicating signal generated by the microcontroller 366 is a rectangular signal having an off-state of at least about 200 μseconds at a frequency of about 30 Hz.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

The invention claimed is:

1. An articulating hand power tool comprising:
a head portion including,
a head housing,
a bit holder rotatably supported by the head housing and defining a first axis of rotation, and
a bearing member operable to transfer a first axial force along the axis of rotation from the bit holder to the head housing;
a frame supporting a motor and rotatably connected to the head portion for placement in a plurality of positions with respect to the head portion and operably connected to the head housing for receiving the first axial force transferred to the head housing; and
an articulating gear system for transferring rotational force generated by the motor to the bit holder at each of the plurality of positions, wherein the first axial force is transferred from the bearing member to the frame without passing through any portion of the articulating gear system.

2. The hand power tool of claim 1 wherein the articulating gear system comprises a bevel gear with a bevel shaft and the frame is configured as a flat bearing surface for the bevel shaft.

3. The hand power tool of claim 2, further comprising:
a first pinion gear engaged with a first side of the bevel gear; and
a second pinion gear engaged with the first side of the bevel gear.

4. The hand power tool of claim 3, further comprising:
a thrust bearing located between the frame and a second side of the bevel gear, the second side opposite to the first side.

5. The hand power tool of claim 1, further comprising:
an outer housing for receiving at least a portion of the frame and operably connected to the frame such that the first axial force received by the frame is transferred to the housing.

6. The hand power tool of claim 5, further comprising:
a variable speed trigger switch extending outwardly from the outer housing and operably connected to the motor for variably controlling the speed of the motor and movable within a plane between a first position corresponding to a first motor speed and a second position corresponding to a second motor speed; and
a finger platform extending outwardly from the outer housing and located at least partially within the plane and adjacent to an upper end portion of the variable speed trigger switch, the finger platform having a length along an axis of the outer housing substantially shorter than the length of the variable speed trigger along the axis.

7. The hand power tool of claim 6, wherein the variable speed trigger switch pivots about a pivot axis, the upper end portion of the variable speed trigger switch located between the pivot axis and the articulating gear system.

8. The hand power tool of claim 1, wherein the bit holder defines a bit holder bore, the tool further comprising:
a cylinder pin extending across the bit holder bore for receiving the first axial force from a bit positioned within the bit holder and operable to transfer the first axial force from the bit to the bit holder.

9. The hand power tool of claim 8, wherein the axis of rotation intersects the cylinder pin.

10. The hand power tool of claim 1, further comprising:
an outer housing for receiving at least a portion of the frame; and
an articulation button movable between a first position wherein the articulation button contacts the outer housing and the head housing so as to restrict rotation of the head housing with respect to the outer housing and a second position wherein the articulation button does not restrict rotation of the head housing with respect to the outer housing.

11. The hand power tool of claim 10, wherein:
the bearing member is operable to transfer a second axial force from the bit holder to the head housing; and
the articulation button is configured to transfer the second axial force from the head housing to the outer housing.

12. The hand power tool of claim 10, wherein:
the head housing comprises a first plurality of teeth;
the articulation button comprises a second plurality of teeth; and
the outer housing comprises a third plurality of teeth, wherein the second plurality of teeth is engaged with both the first plurality of teeth and the third plurality of teeth when the articulation button is in the first position and the second plurality of teeth is engaged with only one of the first plurality of teeth and the third plurality of teeth when the articulation button is in the second position.

13. The hand power tool of claim 1 wherein the articulating gear system includes an output pinion gear, the head portion further comprising:
  a sleeve radially supporting a shaft of the output pinion gear;
  a flange in the head housing contacting the sleeve; and
  a bracket attached to the head housing and contacting the sleeve.

14. The hand power tool of claim 13, wherein:
  the flange is located on a first side of the head housing; and
  the bracket is attached to the first side of the head housing.

15. The hand power tool of claim 1, further comprising:
  an outer housing engaged with the head housing and configured to receive and support at least a portion of the frame;
  a gap in the portion of the head housing surrounding the articulating gear system, into which a portion of the head housing can be rotated; and
  a dust lid which is configured to be wider than the gap to restrict access from outside of the hand power tool to the articulating gear system.

16. The hand power tool of claim 15, further comprising:
  a channel defined between the head housing and the outer housing, the dust lid slidingly supported by the channel.

17. The hand power tool of claim 16, further comprising:
  a first dust lid travel limiter on the head housing configured to contact the dust lid such that the dust lid slides within the channel as the frame rotates with respect to the head portion from a first of the plurality of positions to a second of the plurality of positions; and
  a second dust lid limiter on the outer housing configured to prevent movement of the dust lid past the second dust lid limiter as the frame rotates with respect to the head portion from the first of the plurality of positions to a third of the plurality of positions, the third of the plurality of positions and the second of the plurality of locations located on opposite sides of the first of the plurality of positions.

18. The hand power tool of claim 15, further comprising:
  an articulation detent system including a spring loaded, toothed button which interfaces with mating toothed pockets in the head housing and the outer housing in a locked position and which interfaces only with the head housing in an unlocked position thus allowing rotation of the head portion relative to the outer housing, the detent system being concentric with a bevel gear of the articulating gear system.

19. The hand power tool of claim 18, wherein the articulating gear system further comprises:
  a motor side pinion gear engaged with a first side of the bevel gear, and
  an output side pinion gear engaged with a second side of the bevel gear.

20. The hand power tool of claim 19, further comprising:
  a thrust bearing supporting a second side of the bevel gear, the second side opposite to the first side.

* * * * *